United States Patent
Taninaka et al.

(10) Patent No.: US 12,454,234 B2
(45) Date of Patent: Oct. 28, 2025

(54) IN-VEHICLE DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuta Taninaka, Yokkaichi (JP); Masaya Ina, Yokkaichi (JP); Kota Oda, Yokkaichi (JP); Ryosuke Masuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 19 days.

(21) Appl. No.: 18/572,072

(22) PCT Filed: Jun. 13, 2022

(86) PCT No.: PCT/JP2022/023607
§ 371 (c)(1),
(2) Date: Dec. 19, 2023

(87) PCT Pub. No.: WO2023/276632
PCT Pub. Date: Jan. 5, 2023

(65) Prior Publication Data
US 2024/0286565 A1     Aug. 29, 2024

(30) Foreign Application Priority Data
Jun. 30, 2021 (JP) .................... 2021-109476

(51) Int. Cl.
*G01R 31/74*     (2020.01)
*B60R 16/03*     (2006.01)
(Continued)

(52) U.S. Cl.
CPC .............. *B60R 16/03* (2013.01); *G01R 31/74* (2020.01); *H01H 85/0241* (2013.01);
(Continued)

(58) Field of Classification Search
CPC .... B60R 16/03; G01R 31/74; H01H 85/0241; H01H 2085/0283; H02H 3/046
See application file for complete search history.

(56) References Cited

U.S. PATENT DOCUMENTS 6,278,919 B1 *   8/2001   Hwang ................ G01R 31/006
                                                      307/10.6
8,823,387 B1 *   9/2014   Bullock ................. H02H 3/046
                                                      324/550
(Continued)

FOREIGN PATENT DOCUMENTS

JP    S49-116542 U    10/1974
JP    S53-123444 U    9/1978
(Continued)

OTHER PUBLICATIONS

International Search Report, Application No. PCT/JP2022/023607, mailed Aug. 2, 2022. ISA/Japan Patent Office.

*Primary Examiner* — Levi Gannon
(74) *Attorney, Agent, or Firm* — Honigman LLP

(57) ABSTRACT

An in-vehicle device of the present invention includes a fuse and an upstream capacitor having one end connected to a connection node upstream of the fuse in a current path of current that flows through the fuse. One end of a downstream capacitor is connected to a connection node downstream of the fuse in the current path. A determiner determines whether or not the fuse is blown based on an upstream voltage that passed through the upstream capacitor and a downstream voltage that passed through the downstream capacitor.

8 Claims, 22 Drawing Sheets

(51) Int. Cl.
  *H01H 85/02* (2006.01)
  *H01H 85/46* (2006.01)
  *H02H 3/04* (2006.01)
(52) U.S. Cl.
  CPC ............ *H01H 85/46* (2013.01); *H02H 3/046* (2013.01); *H01H 2085/0283* (2013.01)

(56) References Cited

U.S. PATENT DOCUMENTS

| | | | | |
|---|---|---|---|---|
| 2005/0024218 A1* | 2/2005 | Cuk | ....................... | H01H 85/30 340/638 |
| 2012/0133477 A1* | 5/2012 | West | ....................... | H01H 85/46 337/4 |

FOREIGN PATENT DOCUMENTS

| | | |
|---|---|---|
| JP | H5-43800 | 6/1993 |
| JP | 2003-212065 A | 7/2003 |
| JP | 2005-019133 A | 1/2005 |
| JP | 2006-318768 A | 11/2006 |
| JP | 2009-089490 A | 4/2009 |
| JP | 2022-050861 A | 3/2022 |

* cited by examiner

FIG. 6

| Output voltage of upstream extraction circuit | Output voltage of downstream extraction circuit | State |
|---|---|---|
| < Vp | < Vp | Normal |
| ≥ Vp | ≥ Vp | |
| ≥ Vp | < Vp | Blown |
| < Vp | ≥ Vp | Failure |

Vp: upper threshold

Blown: blowout of fuse

Failure: failure in upstream extraction circuit or downstream extraction circuit

FIG. 9

| Output voltage of upstream extraction circuit | Output voltage of downstream extraction circuit | State |
|---|---|---|
| < Vp | < Vp | Normal |
| ≥ Vp | ≥ Vp | |
| ≥ Vp | < Vp | Blown |
| < Vp | ≥ Vp | Failure |

Vp: upper threshold

Blown: blowout of fuse Fi

Failure: failure in upstream extraction circuit A or downstream extraction circuit Bi

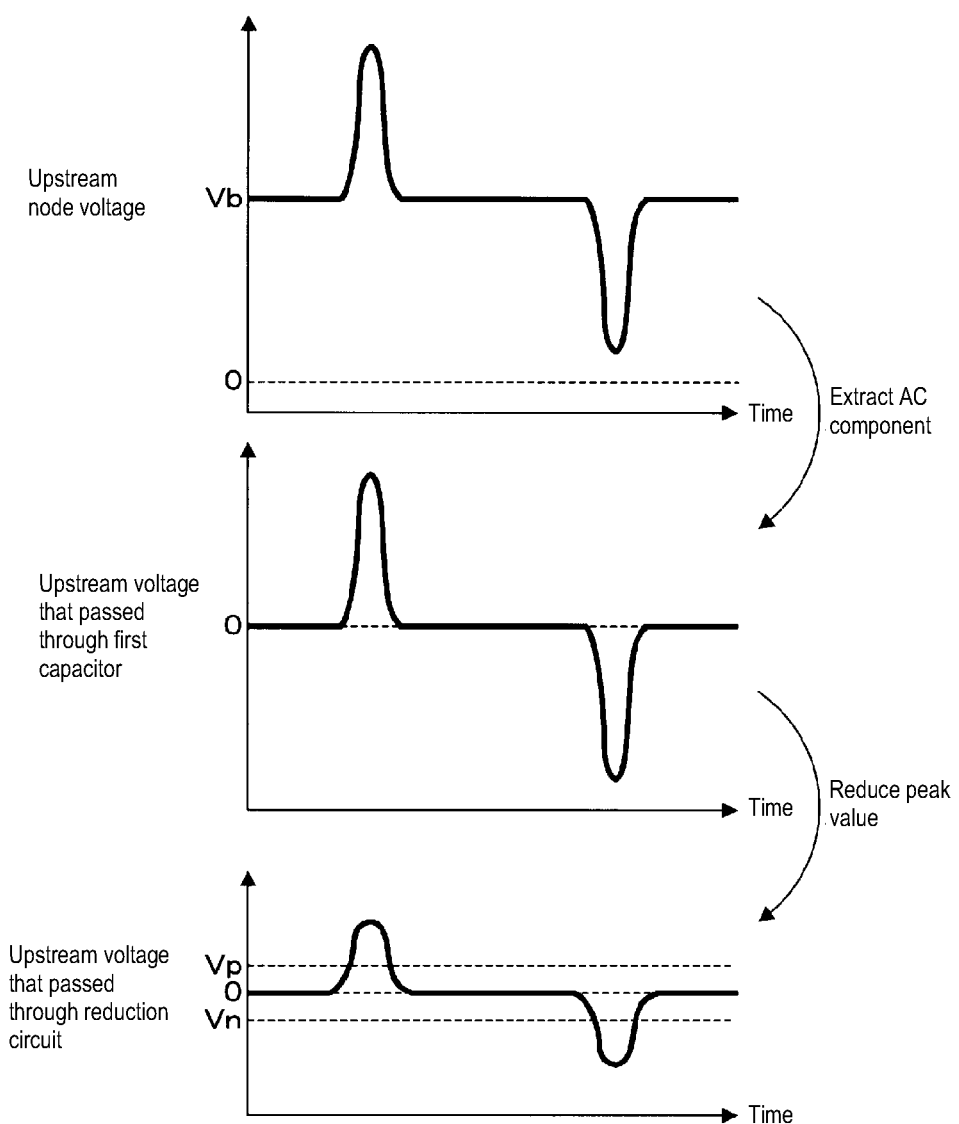

FIG. 13

| Output voltage of upstream extraction circuit | Output voltage of downstream extraction circuit | State |
|---|---|---|
| ≥ Vn and < Vp | ≥ Vn and < Vp | Normal |
| ≥ Vp | ≥ Vp | |
| < Vn | < Vn | |
| ≥ Vp | < Vn | Blown |
| ≥ Vn and < Vp | < Vn or ≥ Vp | Failure |
| < Vn or ≥ Vp | ≥ Vn and < Vp | |
| < Vn | ≥ Vp | |

Vp: upper threshold
Vn: lower threshold
Blown: blowout of fuse
Failure: failure in upstream extraction circuit or downstream extraction circuit

FIG. 16

Operation of determination circuit

| Output voltage of upstream extraction circuit | Output voltage of downstream extraction circuit | Output voltage of determination circuit |
|---|---|---|
| ≥ Vp | < Vn | Low-level voltage |
| ≥ Vp | ≥ Vp | High-level voltage |
| < Vn | < Vn | |
| < Vn | ≥ Vp | |

Vp: upper threshold
Vn: lower threshold

IN-VEHICLE DEVICE

CROSS-REFERENCE TO RELATED APPLICATIONS

This application is the U.S. national stage of PCT/JP2022/023607 filed on Jun. 13, 2022, which claims priority of Japanese Patent Application No. JP 2021-109476 filed on Jun. 30, 2021, the contents of which are incorporated herein.

TECHNICAL FIELD

The present disclosure relates to an in-vehicle device.

BACKGROUND

JP 2003-212065A discloses an in-vehicle device that includes a fuse. In JP 2003-212065A, a battery supplies power to a load via the fuse.

In JP 2003-212065A, consideration is not given to a method for checking whether or not a fuse is blown. If it is necessary for a person to visually check whether or not a fuse is blown, the fuse needs to be arranged at a location in the in-vehicle device where it can be seen by a person. This limits the locations where the fuse can be arranged.

The present disclosure has been made in view of such circumstances, and an object of the present disclosure is to provide an in-vehicle device with a high degree of freedom regarding the arrangement of a fuse.

SUMMARY

An in-vehicle device according to an aspect of the present disclosure includes: a fuse; an upstream capacitor having one end connected to a connection node located upstream of the fuse in a current path of current that flows through the fuse; a downstream capacitor having one end connected to a connection node located downstream of the fuse in the current path; and a determiner configured to determine whether or not the fuse is blown based on an upstream voltage that passed through the upstream capacitor and a downstream voltage that passed through the downstream capacitor.

Advantageous Effects

According to the above aspect, there is a high degree of freedom regarding the arrangement of a fuse.

BRIEF DESCRIPTION OF DRAWINGS

FIG. 6 is a chart showing a relationship between ECU states and output voltages of the upstream extraction circuit and a downstream extraction circuit.

FIG. 9 is a chart showing a relationship between ECU states and output voltages of the upstream extraction circuit and the downstream extraction circuit.

FIG. 12 is a waveform diagram for describing operation of the upstream extraction circuit.

FIG. 13 is a chart showing a relationship between ECU states and output voltages of the upstream extraction circuit and the downstream extraction circuit.

FIG. 16 is a chart for describing operation of the determination circuit.

DETAILED DESCRIPTION OF PREFERRED EMBODIMENTS

Figure 1:
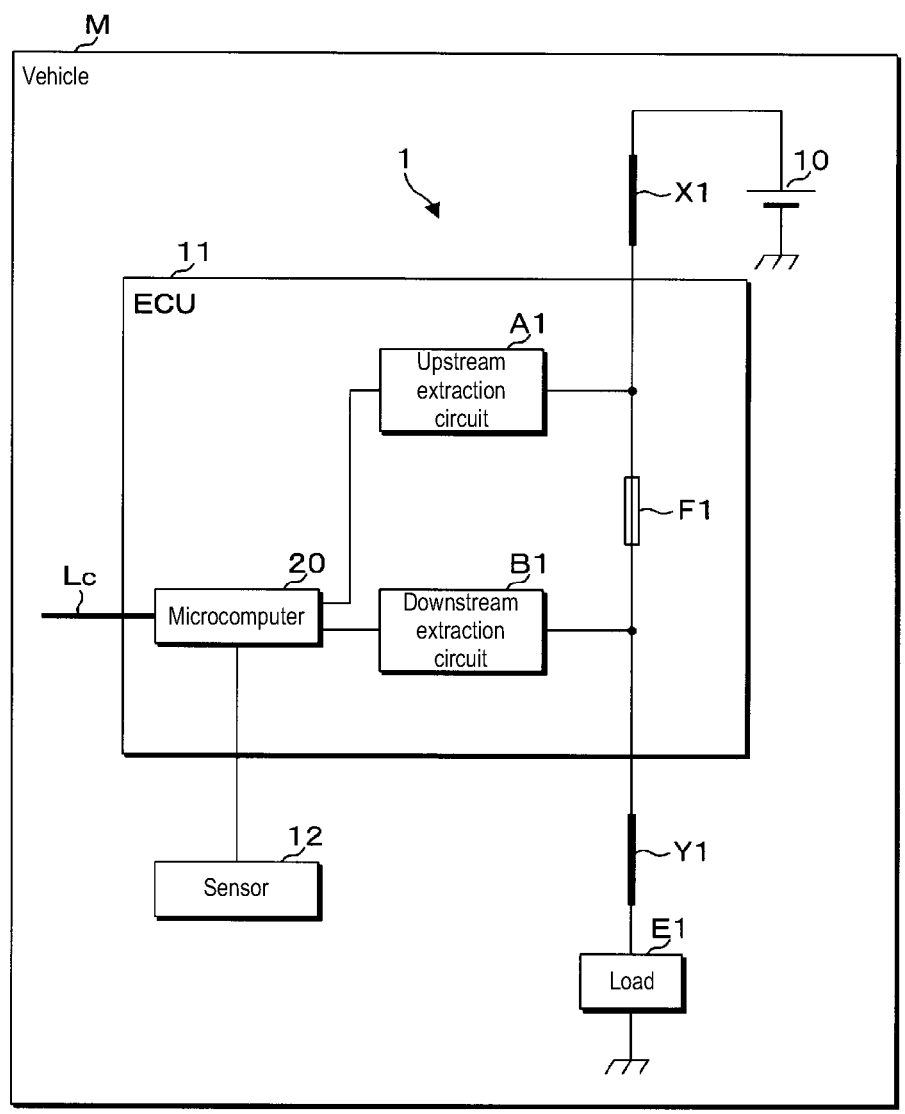
FIG. 1 is a block diagram showing a main configuration of a power supply system in a first embodiment.

First, embodiments of the present disclosure will be listed and described. At least portions of the embodiments described below may be combined.

An in-vehicle device according to an aspect of the present disclosure includes: a fuse; an upstream capacitor having one end connected to a connection node located upstream of the fuse in a current path of current that flows through the fuse; a downstream capacitor having one end connected to a connection node located downstream of the fuse in the current path; and a determiner configured to determine whether or not the fuse is blown based on an upstream voltage that passed through the upstream capacitor and a downstream voltage that passed through the downstream capacitor.

In the above aspect, the AC component of the voltage of the connection node located upstream of the fuse passes through the upstream capacitor. The AC component of the voltage of the connection node located downstream of the fuse passes through the downstream capacitor. If the fuse is not blown, the waveform of the upstream voltage across the upstream capacitor substantially matches the waveform of the downstream voltage across the downstream capacitor. If the fuse is blown, the waveform of the upstream voltage is different from the waveform of the downstream voltage. The determiner determines whether or not the fuse is blown based on the upstream voltage and the downstream voltage. Since the determiner makes the determination, there is no need for a person to visually check whether the fuse is blown. As a result, there is a high degree of freedom regarding the arrangement of the fuse.

In another aspect of the present disclosure, the in-vehicle device may further include a substrate, and a terminal of the fuse may be attached to the substrate by solder.

In the above aspect, the fuse is attached to the substrate. If the fuse is blown, the substrate is replaced.

In another aspect of the present disclosure, the in-vehicle device may further include: an upstream reduction circuit configured to reduce a peak value of the upstream voltage; and a downstream reduction circuit configured to reduce a peak value of the downstream voltage, and the determiner may determine whether or not the fuse is blown based on the upstream voltage whose peak value was reduced by the upstream reduction circuit and the downstream voltage whose peak value was reduced by the downstream reduction circuit.

In the above aspect, the upstream reduction circuit and the downstream reduction circuit respectively reduce the peak values of the upstream voltage and the downstream voltage. This prevents a voltage with a large absolute value from being applied to the determiner.

In another aspect of the present disclosure, the determiner may determine that the fuse is blown in a case where the upstream voltage is greater than or equal to a first threshold and furthermore the downstream voltage is below a second threshold, and the first threshold may be greater than the second threshold.

In the above aspect, if the fuse is blown, the voltage of the connection node located upstream of the fuse increases due to, for example, the inductor component of a conducting wire located upstream of the fuse. The upstream voltage thus also increases. Also, if the fuse is blown, the voltage of the connection node located downstream of the fuse decreases due to, for example, the inductor component of a conducting wire located downstream of the fuse. The downstream voltage thus also decreases. The determiner determines that the fuse is blown if the upstream voltage is greater than or equal to the first threshold and furthermore the downstream voltage is below the second threshold.

In another aspect of the present disclosure, the determiner may include: a first resistor having one end to which a constant voltage is applied; a switch downstream of the first resistor in a second current path of current that flows through the first resistor; and a second resistor downstream of the switch in the second current path, a voltage of a connection node between the first resistor and the switch may be output from the determiner, and the switch may be on in a case where the upstream voltage is greater than or equal to the first threshold and furthermore the downstream voltage is below the second threshold.

In the above aspect, when the switch is off, the determiner outputs a constant voltage. If the fuse is blown, the switch changes from off to on. When the switch is on, the first resistor and the second resistor divide the constant voltage. The determiner outputs the voltage divided by the first resistor and the second resistor. If the fuse is blown, the output voltage of the determiner decreases, thus giving a notification of blowout of the fuse.

In another aspect of the present disclosure, the in-vehicle device may further include: an upstream diode configured to prevent the upstream voltage from decreasing to a voltage below a first predetermined voltage; and a downstream diode configured to prevent the downstream voltage from decreasing to a voltage below a second predetermined voltage.

In the above aspect, the upstream diode is provided, and thus a voltage below the first predetermined voltage is not applied to the determiner. Since the downstream diode is provided, a voltage below the second current threshold is not applied to the determiner.

In another aspect of the present disclosure, the determiner may determine that the fuse is blown in a case where the upstream voltage is greater than or equal to a threshold and furthermore the downstream voltage is below a threshold.

In the above aspect, the determiner detects blowout of the fuse if the upstream voltage is greater than or equal to a threshold and furthermore the downstream voltage is below a threshold.

In another aspect of the present disclosure, the in-vehicle device may include two or more of the fuses and two or more of the downstream capacitors, ends of the downstream capacitors on one side may be connected to connection nodes downstream of the fuses in current paths of current that flows through the fuses, in the current paths, the fuses may have an upstream portion common to all of the fuses, one end of the upstream capacitor may be connected to a connection node of a common portion of the current paths, and the determiner may determine whether or not one of the fuses is blown based on the upstream voltage and the downstream voltage that passed through one of the downstream capacitors.

In the above aspect, the determiner determines whether or not one fuse is blown based on the common upstream voltage.

In another aspect of the present disclosure, the in-vehicle device may include two or more of the fuses and two or more of the downstream capacitors, ends of the downstream capacitors on one side may be connected to connection nodes downstream of the fuses in current paths of current that flows through the fuses, in the current paths, the fuses may have an upstream portion common to all of the fuses, one end of the upstream capacitor may be connected to a connection node of a common portion of the current paths, and the determiner may determine whether or not at least one of the fuses is blown based on the upstream voltage and the downstream voltages that passed through the downstream capacitors.

In the above aspect, the determiner determines whether or not at least one of the fuses is blown.

DETAILS OF EMBODIMENTS OF PRESENT DISCLOSURE

Specific examples of a power supply system according to an embodiment of the present disclosure will be described below with reference to the drawings. Note that the present disclosure is not limited to these examples, but rather is indicated by the scope of the claims, and is intended to include all modifications within the scope and meaning equivalent to the scope of the claims.

First Embodiment

Configuration of Power Supply System

FIG. 1 is a block diagram showing the main configuration of a power supply system 1 in a first embodiment. The power supply system 1 is installed in a vehicle M. The power supply system 1 includes a DC power supply 10, an ECU 11, a sensor 12, and a load E1. The DC power supply 10 is a battery, for example. Also, "ECU" is an abbreviation for "electronic control unit". The ECU 11 functions as an in-vehicle device. The load E1 is a piece of electrical equipment. The ECU 11 includes a microcomputer 20, an upstream extraction circuit A1, a downstream extraction circuit B1, and a fuse F1. The term "microcomputer" is sometimes abbreviated to "MC".

The negative electrode of the DC power supply 10 is grounded. Grounding is achieved by connection to the body of the vehicle M, for example. The body of the vehicle M is a conductor. The positive electrode of the DC power supply 10 is connected to one end of an upstream conducting wire X1. The other end of the upstream conducting wire X1 is connected to one end of the fuse F1. The other end of the fuse F1 is connected to one end of a downstream conducting wire Y1. The other end of the downstream conducting wire Y1 is connected to one end of the load E1. The other end of the load E1 is grounded.

Current flows from the positive electrode of the DC power supply 10 to the upstream conducting wire X1, the fuse F1, the downstream conducting wire Y1, and the load E1 in this order. Power is thus supplied to the load E1. While the load E1 is operating, current flows through the upstream conducting wire X1, the fuse F1, and the downstream conducting wire Y1. When the load E1 stops operating, current stops flowing through the upstream conducting wire X1, the fuse F1, and the downstream conducting wire Y1.

Hereinafter, the path of the current flowing from the positive electrode of the DC power supply 10 through the upstream conducting wire X1, the fuse F1, and the downstream conducting wire Y1 will be simply referred to as the current path. In the current path, the connection node located upstream of the fuse F1 will be referred to as the upstream node. The upstream node is located downstream of the upstream conducting wire X1. In the current path, the connection node located downstream of the fuse F1 will be referred to as the downstream node. The downstream node is located upstream of the downstream conducting wire Y1. The voltage at the upstream node will be referred to as the upstream node voltage. The voltage at the downstream node will be referred to as the downstream node voltage. The reference potential of the upstream node voltage and the downstream node voltage is the ground potential, such as the potential of the body of the vehicle M.

In the ECU 11, the upstream extraction circuit A1 and the downstream extraction circuit B1 are respectively connected to the upstream node and the downstream node. The upstream extraction circuit A1 and the downstream extraction circuit B1 are also each connected to the microcomputer 20. The microcomputer 20 is also connected to the sensor 12. The microcomputer 20 is also connected to a communication line Lc. One or more communication devices (not shown) mounted in the vehicle M are also connected to the communication line Lc.

The upstream extraction circuit A1 extracts the AC component of the upstream node voltage. Hereinafter, the AC component of the upstream node voltage will be referred to as the upstream voltage. The upstream extraction circuit A1 outputs the extracted upstream voltage to the microcomputer 20. The downstream extraction circuit B1 extracts the AC component of the downstream node voltage. Hereinafter, the AC component of the downstream node voltage will be referred to as the downstream voltage. The downstream extraction circuit B1 outputs the extracted downstream voltage to the microcomputer 20. The reference potential of the upstream voltage and the downstream voltage is the ground potential.

The microcomputer 20 detects blowout of the fuse F1 based on the upstream voltage and the downstream voltage that have been input. In the case of detecting that the fuse F1 is blown, the microcomputer 20 transmits a blowout signal indicating that the fuse F1 is blown to a communication device via the communication line Lc. The microcomputer 20 detects the occurrence of a failure in the upstream extraction circuit A1 or the downstream extraction circuit B1 based on the upstream voltage and the downstream voltage that have been input. Upon detecting the occurrence of a failure, the microcomputer 20 transmits a failure signal indicating the occurrence of the failure to a communication device via the communication line Lc.

The sensor 12 detects a vehicle value regarding the vehicle M. Examples of the vehicle value include the speed of the vehicle M, the acceleration of the vehicle M, and the brightness around the vehicle M. Upon detecting the vehicle value, the sensor 12 outputs sensor data including the detected vehicle value to the microcomputer 20. The microcomputer 20 transmits the received sensor data to a communication device via the communication line Lc.

The microcomputer 20 may determine the operation that is to be performed by the load E1. The microcomputer 20 determines the operation to be performed by the load E1 based on, for example, the sensor data input from the sensor 12 or the data received via the communication line Lc. The microcomputer 20 outputs an operation signal indicating the determined operation to the load E1. Upon receiving the operation signal, the load E1 performs the operation indicated by the input operation signal.

Method for Detecting Blowout of Fuse F1

When current flows through the fuse F1, the fuse F1 generates heat. The amount of heat generated by the fuse F1 increases as the current flowing through the fuse F1 increases. In the fuse F1, when the amount of heat generated per unit time exceeds the amount of heat dissipated per unit time, the temperature of the fuse F1 rises. When the temperature of the fuse F1 reaches a certain temperature threshold, the fuse F1 is blown. If a current that is above a certain current threshold flows through the fuse F1, the fuse F1 is blown. This therefore prevents overcurrent from flowing through the upstream conducting wire X1 and the downstream conducting wire Y1.

Blowout of the fuse F1 occurs while current is flowing through the fuse F1. If the fuse F1 is not blown, the upstream node voltage and the downstream node voltage substantially match each other. Therefore, the upstream voltage and the downstream voltage respectively extracted by the upstream extraction circuit A1 and the downstream extraction circuit B1 substantially match each other.

When the fuse F1 is blown, current stops flowing through the upstream conducting wire X1 and the downstream conducting wire Y1. As a result, the current flowing through the upstream conducting wire X1 and the current flowing through the downstream conducting wire Y1 decrease. The upstream conducting wire X1 and the downstream conducting wire Y1 each have an inductor component. When the current flowing through the upstream conducting wire X1 decreases, the inductor component of the upstream conducting wire X1 generates induced electromotive force. Specifically, in the upstream conducting wire X1, the voltage increases at the downstream end whose reference potential is the potential at the upstream end. The upstream node voltage thus increases. As a result, the upstream voltage increases.

When the current flowing through the downstream conducting wire Y1 decreases, the inductor component of the downstream conducting wire Y1 also generates induced electromotive force. Specifically, in the downstream conducting wire Y1, the voltage decreases at the upstream end whose reference potential is the potential at the downstream end. The downstream node voltage thus decreases. As a result, the downstream voltage decreases.

The upstream extraction circuit A1 prevents the upstream voltage from dropping below a predetermined voltage. The predetermined voltage is a negative value, such as −0.6 V. Similarly, the downstream extraction circuit B1 prevents the downstream voltage from dropping below a predetermined voltage. The microcomputer 20 detects blowout of the fuse F1 when the upstream voltage is greater than or equal to a certain upper threshold and furthermore the downstream voltage is below the upper threshold. The upper threshold is a positive value.

Arrangement of Fuse F1

Figure 2:
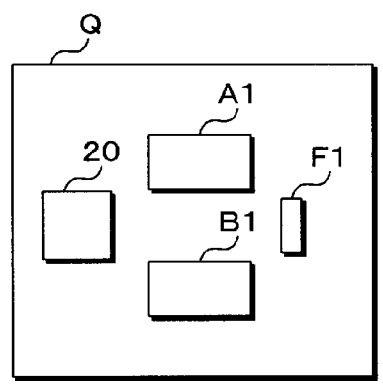
FIG. 2 is an illustrative diagram of an arrangement of a fuse.

FIG. 2 is an illustrative diagram of the arrangement of the fuse F1. The ECU 11 has a rectangular substrate Q. The microcomputer 20, the upstream extraction circuit A1, the downstream extraction circuit B1, and the fuse F1 are arranged on a main face of the substrate Q. The main face is one of the large faces of the substrate, and is different from the end faces.

Attachment of Fuse F1

Figure 3:
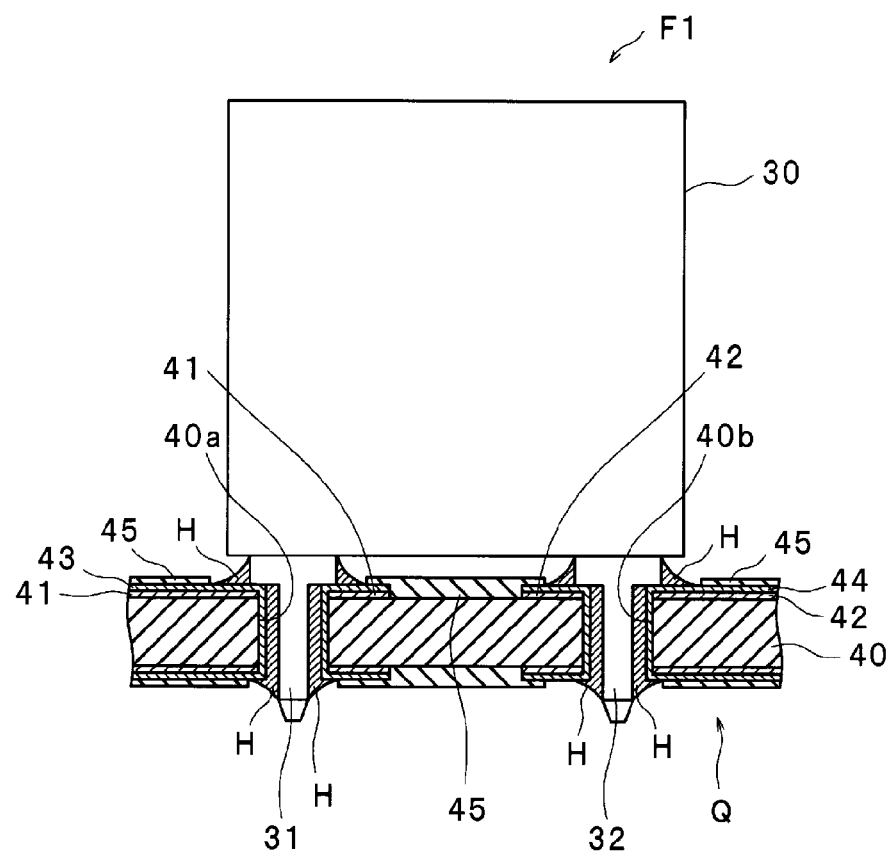
FIG. 3 is an illustrative diagram of attachment of a fuse.

FIG. 3 is an illustrative diagram of attachment of the fuse F1. FIG. 3 shows an external view of the fuse F1 and a cross-section of the substrate Q. In the fuse F1, a rod-shaped first terminal 31 and a rod-shaped second terminal 32 are housed in a hollow cuboid housing box 30 that is open on one side. The first terminal 31 and the second terminal 32 each have one end portion that projects outward from the open side of the housing box 30.

Inside the housing box 30, the first terminal 31 and the second terminal 32 are connected by a fuse portion (not shown). Current flows through the first terminal 31, the fuse portion, and the second terminal 32 in this order. When current flows through the fuse portion, the fuse portion generates heat. The amount of heat generated by the fuse portion increases as the current flowing through the fuse portion increases. In the fuse portion, when the amount of heat generated per unit time exceeds the amount of heat dissipated per unit time, the temperature of the fuse portion rises. When the temperature of the fuse portion reaches the previously mentioned temperature threshold, the fuse portion is blown. When the fuse portion is blown, current stops flowing through the fuse portion. The blowing of the fuse portion corresponds to the blowing of the fuse F1.

A rectangular insulating plate 40 having an insulating property is arranged on the substrate Q. The insulating plate 40 includes a first through hole 40a and a second through hole 40b that pass through the plate in the thickness direction. On the upper main face of the insulating plate 40, a first conductive pattern 41 and a second conductive pattern 42, which have conductivity are respectively arranged around the first through hole 40a and the second through hole 40b.

The inner surface of the first through hole 40a of the substrate Q is covered by a first plating 43 that has conductivity. The first plating 43 has an inner surface portion that covers the inner surface of the first through hole 40a, an upper portion that covers the insulating plate 40 from above the first conductive pattern 41, and a lower portion that covers the insulating plate 40 from below. The inner surface portion of the first plating 43 is connected to both the upper portion and the lower portion. The first plating 43 is electrically connected to the first conductive pattern 41.

Similarly, the inner surface of the second through hole 40b of the substrate Q is covered by a second plating 44 that has conductivity. The second plating 44 has an inner surface portion that covers the inner surface of the second through hole 40b, an upper portion that covers the insulating plate 40 from above the second conductive pattern 42, and a lower portion that covers the insulating plate 40 from below. The inner surface portion of the second plating 44 is connected to both the upper portion and the lower portion. The second plating 44 is electrically connected to the second conductive pattern 42.

The first terminal 31 and the second terminal 32 of the fuse F1 are respectively inserted into the first through hole 40a and the second through hole 40b of the insulating plate 40. The first terminal 31 is located inward of the first plating 43 in the first through hole 40a. The second terminal 32 is located inward of the second plating 44 in the second through hole 40b. The first terminal 31 is attached to the first plating 43 by solder H. The solder H has conductivity. The first terminal 31 is electrically connected to the first conductive pattern 41 via the first plating 43. The second terminal 32 is attached to the second plating 44 by solder H. The second terminal 32 is electrically connected to the second conductive pattern 42 via the second plating 44. The upper sides of the insulating plate 40, the first plating 43, and the second plating 44 are covered with a resist 45 that has an insulating property.

The first terminal 31 and the second terminal 32 are respectively the upstream end and the downstream end of the fuse F1. Current flows from the positive electrode of the DC power supply 10 to the first conductive pattern 41, the first terminal 31, the fuse portion, the second terminal 32, the second conductive pattern 42, and the load E1 in this order.

As described above, the first terminal 31 and the second terminal 32 of the fuse F1 are each attached to the substrate Q by the solder H. Therefore, if the fuse F1 is blown, the substrate Q is replaced. The fuse F1 is a mechanical fuse. One example of the fuse F1 is a blade fuse. In this case, the first terminal 31 and the second terminal 32 each have a flat plate shape. The fuse F1 need only be a fuse that can be attached to the substrate Q by the solder H. Therefore, the fuse F1 may be a chip fuse, a thermal fuse, or a fusible link, for example.

Configuration of Upstream Extraction Circuit A1

Figure 4:
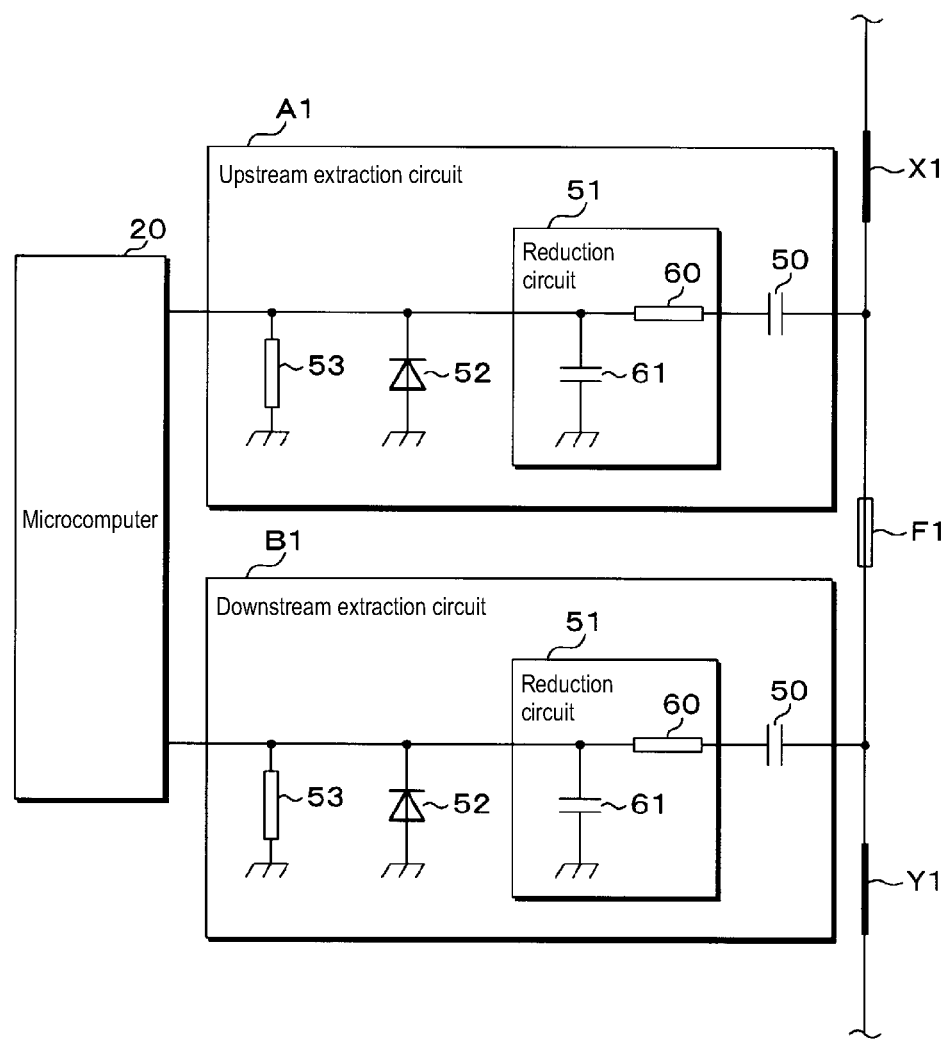
FIG. 4 is a circuit diagram of an upstream extraction circuit.

FIG. 4 is a circuit diagram of the upstream extraction circuit A1. The upstream extraction circuit A1 includes a first capacitor 50, a reduction circuit 51, a diode 52, and a first circuit resistor 53. The reduction circuit 51 includes a second circuit resistor 60 and a second capacitor 61. One end of the first capacitor 50 is connected to the upstream node of the fuse F1. The first capacitor 50 of the upstream extraction circuit A1 functions as an upstream capacitor.

Inside the reduction circuit 51, the other end of the first capacitor 50 is connected to one end of the second circuit resistor 60 of the reduction circuit 51. The other end of the second circuit resistor 60 is connected to the microcomputer 20, the cathode of the diode 52, one end of the first circuit resistor 53, and one end of the second capacitor 61 of the reduction circuit 51. The anode of the diode 52, the other end of the first circuit resistor 53, and the other end of the second capacitor 61 are grounded.

Figure 5:
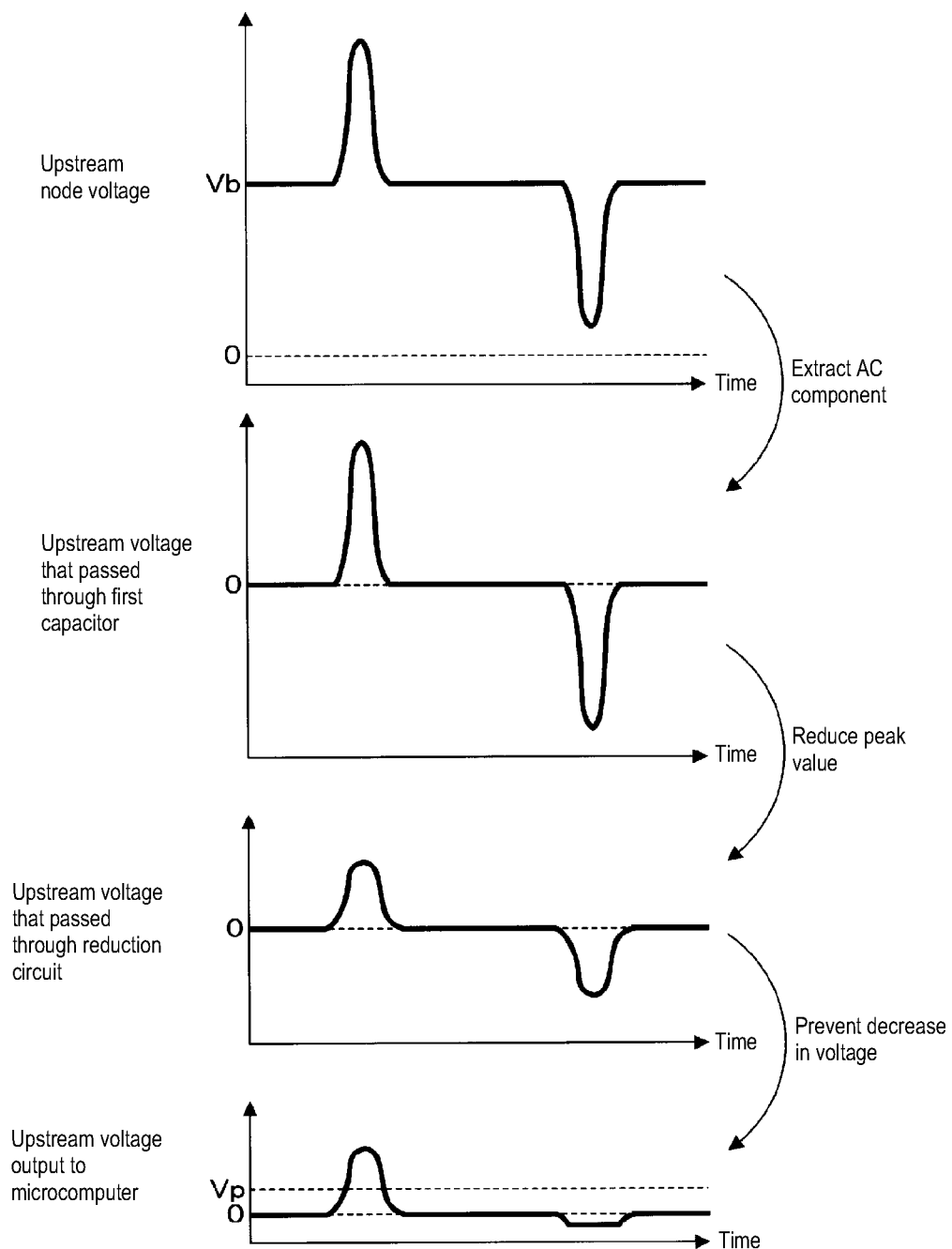
FIG. 5 is a waveform diagram for describing operation of the upstream extraction circuit.

FIG. 5 is a waveform diagram for describing operation of the upstream extraction circuit A1. FIG. 5 shows the waveform of the upstream node voltage, the waveform of the upstream voltage that passed through the first capacitor 50, the waveform of the upstream voltage that passed through the reduction circuit 51, and the waveform of the upstream voltage that is output to the microcomputer 20. Time is shown on the horizontal axis of these waveforms. For example, if a surge occurs in the current path or disturbance noise enters the current path, an AC component will appear in the upstream node voltage. In FIG. 5, the upper threshold is denoted by Vp.

The voltage across the DC power supply 10 will be referred to as the power supply voltage. In FIG. 5, the power supply voltage is denoted by Vb. When there is no AC component, the upstream node voltage matches the power supply voltage Vb. When there is an AC component, the upstream node voltage varies from the power supply voltage Vb. In the example shown in FIG. 5, a positive surge voltage that raises the upstream node voltage and a negative surge voltage that lowers the upstream node voltage are shown. The positive surge voltage first increases over time, and then decreases over time. The negative surge voltage first decreases over time, and then increases over time.

As shown in FIG. 5, the first capacitor 50 extracts the AC component from the upstream node voltage. As described above, the AC component of the upstream node voltage will be referred to as the upstream voltage. The upstream voltage passing through the first capacitor 50 varies from zero V. The upstream voltage passing through the first capacitor 50 includes a positive surge voltage and a negative surge voltage.

In the reduction circuit 51, the upstream voltage that passed through the first capacitor 50 is applied to the second capacitor 61 via the second circuit resistor 60. The second circuit resistor 60 limits the amount of current flowing through first capacitor 50. The second capacitor 61 smoothes the voltage applied thereto via the second circuit resistor 60. The reduction circuit 51 thus reduces the peak value (absolute value) of the upstream voltage that passed through the first capacitor 50. As a result, this prevents a voltage with a large absolute value from being applied to the microcomputer 20. The voltage across the second capacitor 61 is output as an upstream voltage whose peak value was reduced by the reduction circuit 51.

If the upstream voltage that passed through the reduction circuit 51 drops to a certain predetermined voltage that is a negative value, current flows through the anode and cathode of the diode 52 in this order. The voltage therefore never drops to a voltage below the predetermined voltage. The diode 52 prevents the upstream voltage whose peak value was reduced by the reduction circuit 51 from dropping to a voltage below the predetermined voltage. Accordingly a voltage below the predetermined voltage is never applied to the microcomputer 20. The diode 52 of the upstream extraction circuit A1 functions as an upstream diode. The absolute value of the predetermined voltage is the absolute value of the forward voltage of the diode 52, and is 0.6 V for example. Due to the diode 52, an upstream voltage that is prevented from dropping below the predetermined voltage is applied across the first circuit resistor 53. The upstream voltage applied across the first circuit resistor 53 is output to the microcomputer 20.

The allowable range of voltage that is allowed to be input to the microcomputer 20 is limited. Due to the operation of the reduction circuit 51 and the diode 52, the voltage input to the microcomputer 20 falls within the allowable range.

Configuration of Downstream Extraction Circuit B1

As shown in FIG. 4, the downstream extraction circuit B1 has a configuration similar to that of the upstream extraction circuit A1. In the description of the configuration of the upstream extraction circuit A1, replace the upstream extraction circuit A1, the upstream node, the upstream node voltage, and the upstream voltage respectively with the downstream extraction circuit B1, the downstream node, the downstream node voltage, and the downstream voltage. This therefore obtains a description of the configuration of the downstream extraction circuit B1.

Accordingly, one end of the first capacitor 50 of the downstream extraction circuit B1 is connected to the downstream node. In the downstream extraction circuit B1, the reduction circuit 51 reduces the peak value of the downstream voltage that passed through the first capacitor 50. Accordingly this prevents a voltage with a large absolute value from being applied to the microcomputer 20. The diode 52 of the downstream extraction circuit B1 prevents the downstream voltage whose peak value was reduced by the reduction circuit 51 from dropping to a voltage below a predetermined voltage. Accordingly a voltage below the predetermined voltage is never applied to the microcomputer 20. Due to the operation of the reduction circuit 51 and the diode 52, the voltage input to the microcomputer 20 falls within the allowable range. The first capacitor 50, the reduction circuit 51, and the diode 52 of the downstream extraction circuit B1 respectively function as a downstream capacitor, a downstream reduction circuit, and a downstream diode. Note that it is preferable that the first capacitors 50 of the upstream extraction circuit A1 and the downstream extraction circuit B1 have the same capacitance.

The predetermined voltage of the diode 52 of the upstream extraction circuit A1 corresponds to a first predetermined voltage. The predetermined voltage of the diode 52 of the downstream extraction circuit B1 corresponds to a second predetermined voltage. It is preferable that the predetermined voltage of the diode 52 of the upstream extraction circuit A1 is the same as the predetermined voltage of the diode 52 of the downstream extraction circuit B1.

Determination of State of ECU 11

FIG. 6 is a chart showing the relationship between states of the ECU 11 and output voltages of the upstream extraction circuit A1 and the downstream extraction circuit B1. As shown in FIG. 6, when the output voltages of the upstream extraction circuit A1 and the downstream extraction circuit B1 are both below the upper threshold Vp, or greater than or equal to the upper threshold Vp, the microcomputer 20 determines that the state of the ECU 11 is a normal state. When the output voltage of the upstream extraction circuit A1 is greater than or equal to the upper threshold Vp and furthermore the output voltage of the downstream extraction circuit B1 is below the upper threshold Vp, the microcomputer 20 determines that the fuse F1 is blown.

As long as a failure has not occurred in the upstream extraction circuit A1 or the downstream extraction circuit B1, the state of the ECU 11 does not transition to a state in which the output voltage of the upstream extraction circuit A1 is below the upper threshold Vp and furthermore the output voltage of the downstream extraction circuit B1 is greater than or equal to the upper threshold Vp. Accordingly, when the output voltage of the upstream extraction circuit A1 is below the upper threshold Vp and furthermore the output voltage of the downstream extraction circuit B1 is greater than or equal to the upper threshold Vp, the microcomputer 20 determines that a failure has occurred in the upstream extraction circuit A1 or the downstream extraction circuit B1.

Operation of Microcomputer 20

The microcomputer 20 includes a processing element that executes processing and a storage unit that stores data. The processing element is a CPU (Central Processing Unit), for example. The storage unit is constituted by a volatile memory and a nonvolatile memory, for example. A computer program is stored in the storage unit. In the microcomputer 20, the processing element executes blowout detection processing to detect blowout of the fuse F1, by executing a computer program. Note that the microcomputer 20 may include two or more processing elements. In this case, the processing elements may execute the blowout detection processing in cooperation with each other.

Figure 7:
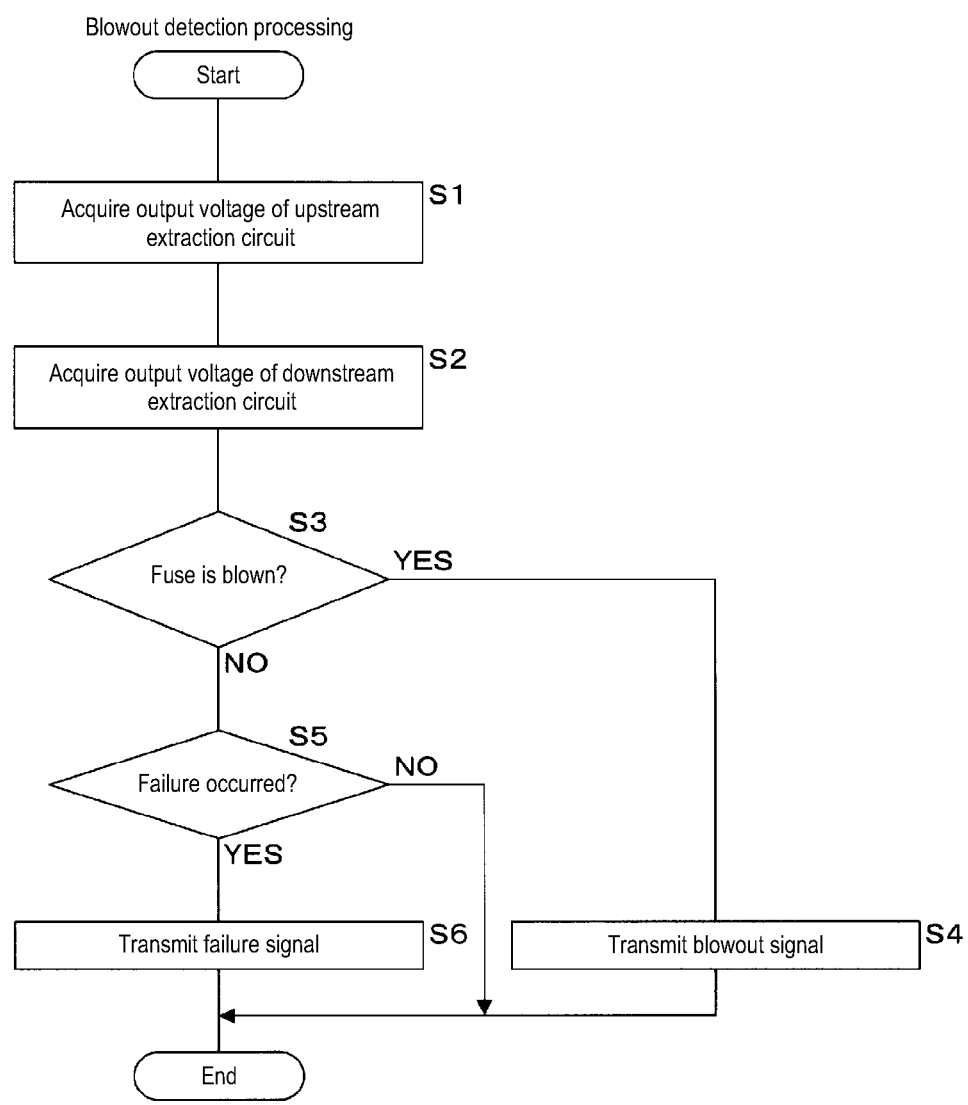
FIG. 7 is a flowchart showing a procedure of blowout detection processing.

FIG. 7 is a flowchart showing a procedure of blowout detection processing. In the blowout detection processing, first, the microcomputer 20 acquires the output voltage of the upstream extraction circuit A1 (step S1). Next, the microcomputer 20 acquires the output voltage of the downstream extraction circuit B1 (step S2). The microcomputer 20 determines whether or not the fuse F1 is blown based on the two output voltages obtained in steps S1 and S2 (step S3). In step S3, as shown in FIG. 6, if the output voltage of the upstream extraction circuit A1 is greater than or equal to the upper threshold Vp and furthermore the output voltage of the downstream extraction circuit B1 is below the upper threshold Vp, the microcomputer 20 determines that the fuse F1 is blown.

The output voltage of the upstream extraction circuit A1 is the upstream voltage that passed through the first capacitor 50 of the upstream extraction circuit A1, and is the upstream voltage whose peak value was reduced by the reduction circuit 51 of the upstream extraction circuit A1. The output voltage of the downstream extraction circuit B1 is the downstream voltage that passed through the first capacitor 50 of the downstream extraction circuit B1, and is the downstream voltage whose peak value was reduced by the reduction circuit 51 of the downstream extraction circuit B1. The microcomputer 20 therefore functions as a determiner.

In the case of determining that the fuse F1 is blown (S3: YES), the microcomputer 20 transmits the blowout signal to a communication device via the communication line Lc (step S4). In the case of determining that the fuse F1 is not blown (S3: NO), the microcomputer 20 determines whether or not a failure has occurred in the upstream extraction circuit A1 or the downstream extraction circuit B1 (step S5). In step S5, as shown in FIG. 6, if the output voltage of the upstream extraction circuit A1 is below the upper threshold Vp and furthermore the output voltage of the downstream extraction circuit B1 is greater than or equal to the upper threshold Vp, the microcomputer 20 determines that a failure has occurred in the upstream extraction circuit A1 or the downstream extraction circuit B1.

In the case of determining that a failure has occurred (S5: YES), the microcomputer 20 transmits the failure signal to a communication device via the communication line Lc (step S6). After executing steps S4 and S6, the microcomputer 20 ends the blowout detection processing. In this case, the microcomputer 20 does not execute the blowout detection processing again.

If the output voltages of the upstream extraction circuit A1 and the downstream extraction circuit B1 are both below the upper threshold Vp, or greater than or equal to the upper threshold Vp, in step S5, the microcomputer 20 determines that a failure has not occurred. In the case of determining that a failure has not occurred (S5: NO), the microcomputer 20 ends the blowout detection processing. In this case, the microcomputer 20 executes the blowout detection processing again. The microcomputer 20 periodically executes the blowout detection processing until blowout of the fuse F1 or the occurrence of a failure is detected.

Effects of ECU 11

In the ECU 11, the microcomputer 20 determines whether or not the fuse F1 is blown. Therefore, there is no need for a person to visually check whether the fuse F1 is blown. As a result, there is a high degree of freedom regarding the arrangement of the fuse F1, that is to say the substrate Q.

Second Embodiment

In the first embodiment, power is supplied to one load via the ECU 11. However, power may be supplied to two or more loads via the ECU 11. The following description of a second embodiment focuses on differences from the first embodiment. Configurations other than those described below are the same as those of the first embodiment, and constituent elements that are the same as those of the first embodiment are denoted by the same reference signs as in the first embodiment and will not be described.

Configuration of Power Supply System 1

Figure 8:
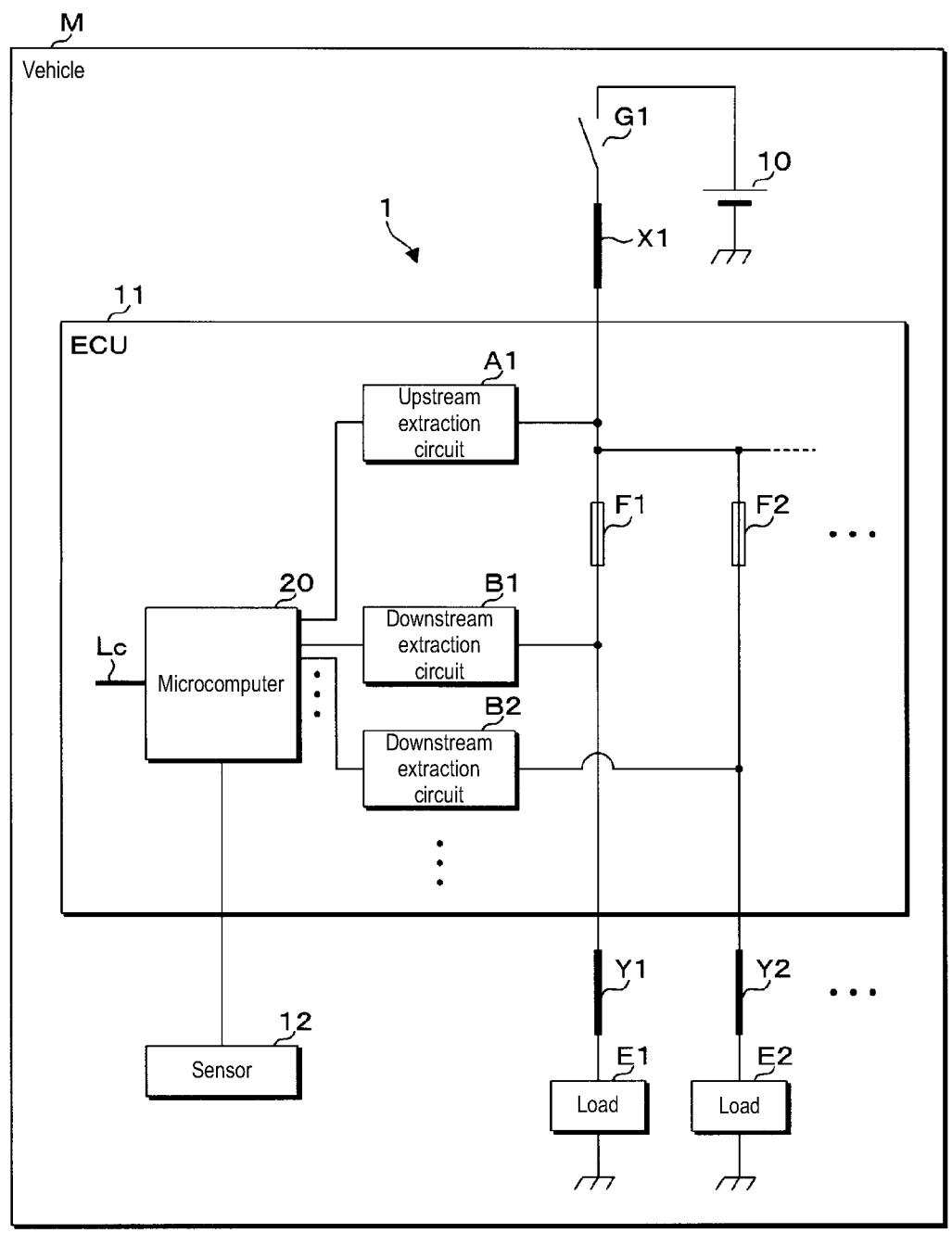
FIG. 8 is a block diagram showing a main configuration of the power supply system in a second embodiment.

FIG. 8 is a block diagram showing the main configuration of the power supply system 1 in the second embodiment. The power supply system 1 of the second embodiment includes the DC power supply 10, the ECU 11, and the sensor 12, similarly to the first embodiment. The power supply system 1 of the second embodiment further includes a plurality of loads E1, E2, . . . and an upstream switch G1. A plurality of downstream conducting wires Y1, Y2, . . . are arranged in the power supply system 1 of the second embodiment. Similarly to the first embodiment, the ECU 11 in the second embodiment includes the microcomputer 20 and the upstream extraction circuit A1. The ECU 11 in the second embodiment further includes a plurality of downstream extraction circuits B1, B2, . . . and a plurality of fuses F1, F2, and so on.

In the following, "i" represents a natural number. The natural number "i" may be 1, 2, or so on. The load Ei is a piece of electrical equipment. The positive electrode of the DC power supply 10 is connected to one end of the upstream switch G1. The other end of the upstream switch G1 is connected to one end of the upstream conducting wire X1. The other end of the upstream conducting wire X1 is connected to one end of the fuse Fi. The other end of the fuse Fi is connected to one end of the downstream conducting wire Yi. The other end of the downstream conducting wire Yi is connected to one end of the load Ei. The other end of the load Ei is grounded.

The upstream switch G1 is the ignition switch of the vehicle M, for example. When the upstream switch G1 is on, current flows from the positive electrode of the DC power supply 10 to the upstream switch G1, the upstream conducting wire X1, the fuse Fi, the downstream conducting wire Yi, and the load Ei in this order. Power is thus supplied to the load Ei. While the load Ei is operating, current flows through the upstream switch G1, the upstream conducting wire X1, the fuse Fi, and the downstream conducting wire Yi. When the load Ei stops operating, current stops flowing through the upstream switch G1, the upstream conducting wire X1, the fuse Fi, and the downstream conducting wire Yi. When the upstream switch G1 is off, current does not flow through the fuses F1, F2, and so on. Note that the microcomputer 20 may control operation of the load Ei similarly to operation of the load E1 in the first embodiment.

Hereinafter, the path of current flowing from the positive electrode of the DC power supply 10 through the upstream switch G1, the upstream conducting wire X1, the fuse Fi, and the downstream conducting wire Yi will be referred to as the current path of the fuse Fi. In the current paths of the fuses F1, F2, . . . , the fuses F1, F2, . . . have an upstream portion common to all of the fuses F1, F2, and so on. In the second embodiment, the upstream node is the connection node of the common portion on the upstream side of the fuses F1, F2, . . . in the current paths. The upstream node is located downstream of the upstream conducting wire X1. One end of the first capacitor 50 of the upstream extraction circuit A1 is connected to the upstream node, similarly to the first embodiment.

In the second embodiment, the connection node located downstream of the fuse Fi in the current path of the fuse Fi will be referred to as the downstream node of the fuse Fi. The downstream node of the fuse Fi is located upstream of downstream conducting wire Yi. Similarly to first embodiment, the voltage at the upstream node will be referred to as the upstream node voltage. In the second embodiment, the voltage at the downstream node of the fuse Fi will be referred to as the downstream node voltage of the fuse Fi. The reference potential of the upstream node voltage and the downstream node voltages of the fuses F1, F2, . . . is the ground potential.

As mentioned in the description of the first embodiment, the upstream voltage is the AC component of the upstream node voltage. In the second embodiment, the downstream extraction circuit Bi extracts the AC component of the downstream node voltage of the fuse Fi. In the following, the AC component of the downstream node voltage of the fuse Fi will be referred to as the downstream voltage of the fuse Fi. The downstream extraction circuit Bi outputs the extracted downstream voltage of the fuse Fi to the microcomputer 20. The reference potential of the downstream voltage of the fuse Fi is the ground potential.

The microcomputer 20 detects blowout of the fuse Fi based on the upstream voltage and the downstream voltage of the fuse Fi. Upon detecting that the fuse Fi is blown, the microcomputer 20 transmits a blowout signal indicating that the fuse Fi is blown to a communication device via the communication line Lc. The microcomputer 20 detects the occurrence of a failure in the upstream extraction circuit A1 or the downstream extraction circuit Bi based on the upstream voltage and the downstream voltage of the fuse Fi. Upon detecting the occurrence of a failure, the microcomputer 20 transmits a failure signal indicating the occurrence of the failure to a communication device via the communication line Lc.

Method for Detecting Blowout of Fuse Fi

When upstream switch G1 is off, current does not flow through the fuse Fi, and thus blowout of the fuse Fi does not occur. While the upstream switch G1 is on, if the temperature of the fuse Fi reaches a temperature threshold, the fuse Fi is blown.

The upstream conducting wire X1 operates similarly to the first embodiment. The fuse Fi and the downstream conducting wire Yi operate similarly to the fuse F1 and the downstream conducting wire Y1 of the first embodiment. When the fuse Fi is blown, the current flowing through the upstream conducting wire X1 decreases. The inductor component of the upstream conducting wire X1 generates an induced electromotive force. Therefore, in the upstream conducting wire X1, the voltage increases at the downstream end whose reference potential is the potential at the upstream end. As a result, the upstream node voltage increases, and thus the upstream voltage increases. When the fuse Fi is blown, the current flowing through the downstream conducting wire Yi decreases. The inductor component of the downstream conducting wire Yi generates an induced electromotive force. Therefore, in the downstream conducting wire Yi, the voltage decreases at the upstream end whose reference potential is the potential at the downstream end. As a result, the downstream node voltage decreases, and thus the downstream voltage decreases.

Similarly to the first embodiment, the upstream extraction circuit A1 prevents the upstream voltage from dropping below a predetermined voltage. Similarly to the downstream extraction circuit B1 of the first embodiment, the downstream extraction circuit Bi prevents the downstream voltage of the fuse Fi from dropping to a voltage below a predetermined voltage. If the upstream voltage is greater than or equal to the upper threshold and furthermore the downstream voltage of the fuse Fi is below the upper threshold, the microcomputer 20 detects that the fuse Fi is blown.

Arrangement and Attachment of Fuses F1, F2, . . .

The fuses F1, F2, . . . are each arranged on a main face of the substrate Q. The fuse Fi has a configuration similar to that of the fuse F1 of the first embodiment. The first terminal 31 and the second terminal 32 of the fuse Fi are each attached to the substrate Q by solder H. Therefore, if at least one of the fuses F1, F2, . . . is blown, the substrate Q is replaced.

Configuration of Downstream Extraction Circuit Bi

The downstream extraction circuit Bi has a configuration similar to that of the downstream extraction circuit Bi in the first embodiment. The downstream extraction circuit Bi therefore includes the first capacitor 50, the reduction circuit 51, the diode 52, and the first circuit resistor 53. One end of the first capacitor 50 of the downstream extraction circuit Bi is connected to the downstream node of the fuse Fi. The AC component of the downstream node voltage of the fuse Fi (i.e., the downstream voltage of the fuse Fi) passes through the first capacitor 50 of the downstream extraction circuit Bi. Note that it is preferable that the first capacitors 50 of the upstream extraction circuit A1 and the downstream extraction circuit Bi have the same capacitance.

In the downstream extraction circuit Bi, the reduction circuit 51 reduces the peak value of the downstream voltage that passed through the first capacitor 50. Accordingly, this prevents a voltage with a large absolute value from being applied to the microcomputer 20. The diode 52 of the downstream extraction circuit Bi prevents the downstream voltage whose peak value was reduced by the reduction circuit 51 from dropping to a voltage below a predetermined voltage. Accordingly, a voltage below the predetermined voltage is never applied to the microcomputer 20. Due to the operation of the reduction circuit 51 and the diode 52, the voltage input to the microcomputer 20 falls within the allowable range. The first capacitor 50, the reduction circuit 51, and the diode 52 of the downstream extraction circuit Bi respectively function as a downstream capacitor, a downstream reduction circuit, and a downstream diode. The ECU 11 includes a plurality of downstream extraction circuits B1, B2, and so on. Therefore, two or more first capacitors 50 function as downstream capacitors.

Determination of State of ECU 11

FIG. 9 is a chart showing the relationship between states of the ECU 11 and output voltages of the upstream extraction circuit A1 and the downstream extraction circuit Bi. As shown in FIG. 9, when the output voltages of the upstream extraction circuit A1 and the downstream extraction circuit Bi are both below the upper threshold Vp, or greater than or equal to the upper threshold Vp, the microcomputer 20 determines that the state of the ECU 11 is a normal state. When the output voltage of the upstream extraction circuit A1 is greater than or equal to the upper threshold Vp and furthermore the output voltage of the downstream extraction circuit Bi is below the upper threshold Vp, the microcomputer 20 determines that the fuse Fi is blown.

As long as a failure has not occurred in the upstream extraction circuit A1 or the downstream extraction circuit Bi, the state of the ECU 11 does not transition to a state in which the output voltage of the upstream extraction circuit A1 is below the upper threshold Vp and furthermore the output voltage of the downstream extraction circuit Bi is greater than or equal to the upper threshold Vp. Accordingly, when the output voltage of the upstream extraction circuit A1 is below the upper threshold Vp and furthermore the output voltage of the downstream extraction circuit Bi is greater than or equal to the upper threshold Vp, the microcomputer 20 determines that a failure has occurred in the upstream extraction circuit A1 or the downstream extraction circuit Bi.

Operation of Microcomputer 20

The microcomputer 20 executes blowout detection processing to detect blowout of the fuse Fi, by executing a computer program. When the upstream switch G1 is on, the microcomputer 20 executes blowout detection processing for each of the fuses F1, F2, and so on. If the microcomputer 20 includes two or more processing elements, the processing elements may execute the blowout detection processing for the fuses F1, F2, . . . in cooperation with each other.

The blowout detection processing for the fuse Fi is similar to the blowout detection processing for the fuse F1 in the first embodiment. In the description of the blowout detection processing of the fuse F1 in the first embodiment, replace the downstream extraction circuit B1 and the fuse F1 respectively with the downstream extraction circuit Bi and the fuse Fi. This therefore obtains a description of blowout detection processing for the fuse Fi. In the blowout detection processing for the fuse Fi, the microcomputer 20 determines whether or not the fuse Fi is blown based on the upstream voltage and the downstream voltage of the fuse Fi. As described above, the microcomputer 20 uses the common upstream voltage to determine whether or not the fuse Fi is blown.

Effects of ECU 11

The ECU 11 in the second embodiment has effects similar to those of the ECU 11 in the first embodiment.

Third Embodiment

In the second embodiment, a switch may be placed in the current paths of the fuses F1, F2, and so on.

The following description of a third embodiment focuses on differences from the second embodiment. Configurations other than those described below are the same as those of the second embodiment, and constituent elements that are the same as those of the second embodiment are denoted by the same reference signs as in the second embodiment and will not be described.

Configuration of Power Supply System 1

Figure 10:
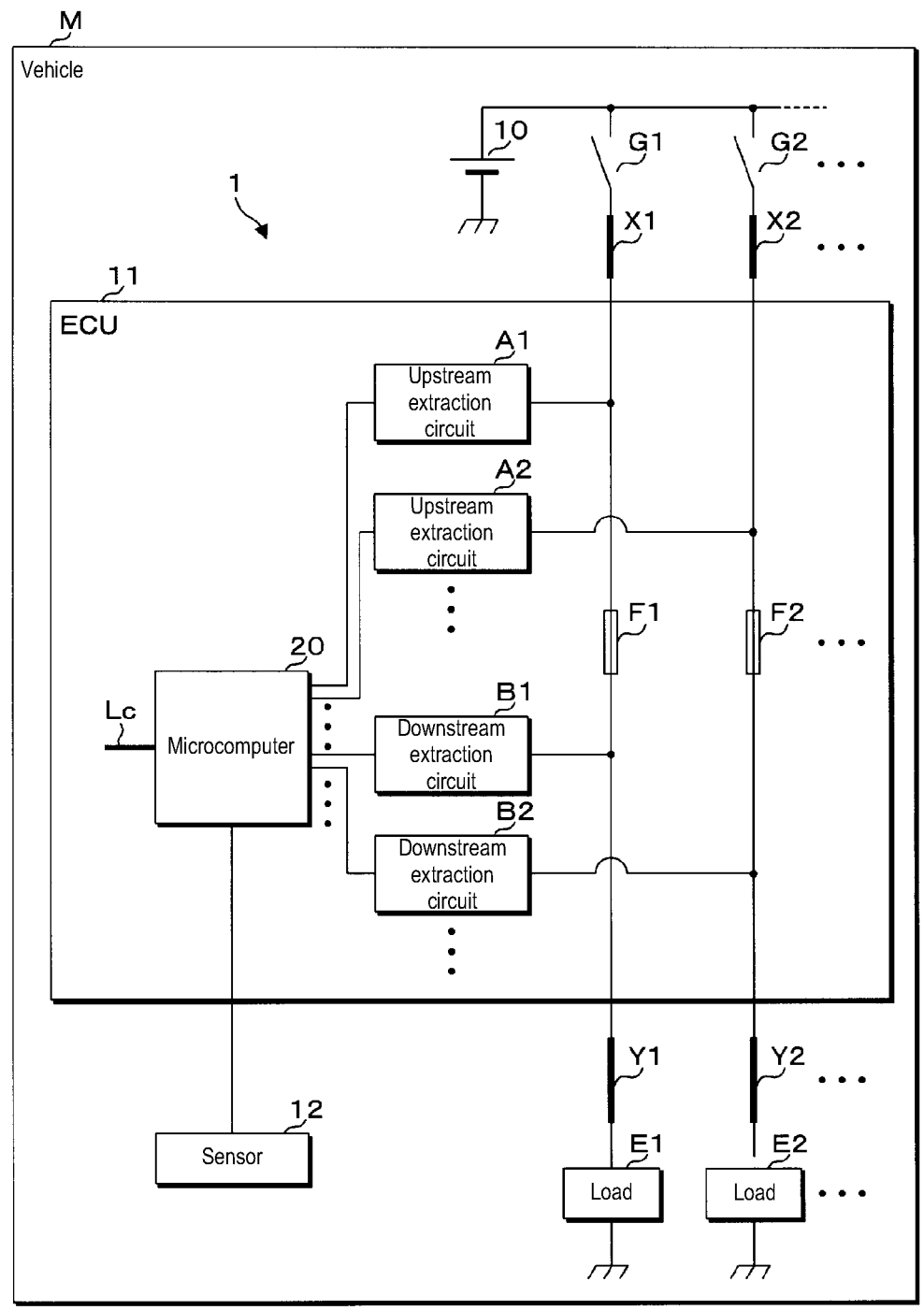
FIG. 10 is a block diagram showing a main configuration of the power supply system in a third embodiment.

FIG. 10 is a block diagram showing the main configuration of the power supply system 1 in the third embodiment. Similarly to the second embodiment, the power supply system 1 of the third embodiment includes the DC power supply 10, the ECU 11, the sensor 12, and a plurality of loads E1, E2, and so on. The power supply system 1 of the third embodiment further includes a plurality of upstream switches G1, G2, and so on. A plurality of upstream conducting wires X1, X2, . . . are arranged in the power supply system 1 according to the third embodiment.

The positive electrode of the DC power supply 10 is connected to one end of each of the upstream switches G1, G2, and so on. The other end of the upstream switch Gi is connected to one end of the upstream conducting wire Xi. As mentioned in the description of the second embodiment, "i" is a natural number. The other end of the upstream conducting wire Xi is connected to one end of the fuse Fi.

When the upstream switch Gi is on, current flows from the positive electrode of the DC power supply 10 to the upstream switch Gi, the upstream conducting wire Xi, the fuse Fi, the downstream conducting wire Yi, and the load Ei in this order. Power is thus supplied to the load Ei. While the load Ei is operating, current flows through the upstream switch Gi, the upstream conducting wire Xi, the fuse Fi, and the downstream conducting wire Yi. When the load Ei stops operating, current stops flowing through the upstream switch Gi, the upstream conducting wire Xi, the fuse Fi, and the downstream conducting wire Yi. When upstream switch Gi is off, current does not flow through the fuse Fi.

In the third embodiment, the current path of the fuse Fi is the path of current that flows from the positive electrode of the DC power supply 10 through the upstream switch Gi, the upstream conducting wire Xi, the fuse Fi, and the downstream conducting wire Yi. In the current path of the fuse Fi, the connection node located upstream of the fuse Fi will be referred to as the upstream node of the fuse Fi. The upstream node of the fuse Fi is located downstream of the upstream conducting wire Xi. The voltage at the upstream node of the fuse Fi will be referred to as the upstream node voltage of the fuse Fi. The reference potential of the upstream node voltage of the fuse Fi is the ground potential. In the third embodiment, the downstream node and the downstream node voltage of the fuse Fi are defined similarly to the second embodiment.

The upstream extraction circuit Ai extracts the AC component of the upstream node voltage of the fuse Fi. Hereinafter, the AC component of the upstream node voltage of the fuse Fi will be referred to as the upstream voltage of the fuse Fi. The upstream extraction circuit Ai outputs the extracted upstream voltage of the fuse Fi to the microcomputer 20. The reference potential of the upstream voltage of the fuse Fi is the ground potential.

The microcomputer 20 detects blowout of the fuse Fi based on the upstream voltage and the downstream voltage of the fuse Fi. Upon detecting that the fuse Fi is blown, the microcomputer 20 transmits a blowout signal indicating that the fuse Fi is blown to a communication device via the communication line Lc. The microcomputer 20 detects the occurrence of a failure in the upstream extraction circuit Ai or the downstream extraction circuit Bi based on the upstream voltage and the downstream voltage of the fuse Fi. Upon detecting the occurrence of a failure, the microcomputer 20 transmits a failure signal indicating the occurrence of the failure to a communication device via the communication line Lc.

Method for Detecting Blowout of Fuse Fi

When the upstream switch Gi is off, current does not flow through the fuse Fi, and thus blowout of the fuse Fi does not occur. While the upstream switch Gi is on, if the temperature of the fuse Fi reaches a temperature threshold, the fuse Fi is blown.

The upstream conducting wire Xi operates similarly to the upstream conducting wire X1 in the first embodiment. When the fuse Fi is blown, the current flowing through the upstream conducting wire Xi decreases. The inductor component of the upstream conducting wire Xi generates an induced electromotive force. Therefore, in the upstream conducting wire Xi, the voltage increases at the downstream end whose reference potential is the potential at the one end on the upstream side. As a result, the upstream node voltage of the fuse Fi increases, and thus the upstream voltage of the fuse Fi increases. Similarly to the second embodiment, when the fuse Fi is blown, in the downstream conducting wire Yi, the voltage increases at upstream end whose reference potential is the potential at the one downstream end. As a result, the downstream node voltage of the fuse Fi decreases, and thus the downstream voltage of the fuse Fi decreases.

Similarly to the upstream extraction circuit A1 in the first embodiment, the upstream extraction circuit Ai prevents the upstream voltage of the fuse Fi from dropping to a voltage below a predetermined voltage. Similarly to the second embodiment, the downstream extraction circuit Bi prevents the downstream voltage of the fuse Fi from dropping to a voltage below a predetermined voltage. The microcomputer 20 detects blowout of the fuse F1 when the upstream voltage of the fuse Fi is greater than or equal to the upper threshold and furthermore the downstream voltage of the fuse Fi is below the upper threshold.

Configuration of Upstream Extraction Circuit Ai

The upstream extraction circuit Ai has a configuration similar to that of the upstream extraction circuit A1 in the first embodiment. The upstream extraction circuit Ai therefore includes the first capacitor 50, the reduction circuit 51, the diode 52, and the first circuit resistor 53. One end of the first capacitor 50 of the upstream extraction circuit Ai is connected to the upstream node of the fuse Fi. The AC component of the upstream node voltage of the fuse Fi (i.e., the upstream voltage of the fuse Fi) passes through the first capacitor 50 of the upstream extraction circuit Ai. Note that it is preferable that the first capacitors 50 of the upstream extraction circuit Ai and the downstream extraction circuit Bi have the same capacitance.

In the upstream extraction circuit Ai, the reduction circuit 51 reduces the peak value of the upstream voltage that passed through the first capacitor 50. Accordingly, this prevents a voltage with a large absolute value from being applied to the microcomputer 20. The diode 52 of the upstream extraction circuit Ai prevents the upstream voltage whose peak value was reduced by the reduction circuit 51 from dropping to a voltage below a predetermined voltage. Accordingly, a voltage below the predetermined voltage is never applied to the microcomputer 20. Due to the operation of the reduction circuit 51 and the diode 52, the voltage input to the microcomputer 20 falls within the allowable range. The first capacitor 50, the reduction circuit 51, and the diode 52 of the upstream extraction circuit Ai respectively function as an upstream capacitor, an upstream reduction circuit, and an upstream diode. The ECU 11 includes a plurality of upstream extraction circuits A1, A2, and so on. Therefore, two or more first capacitors 50 function as upstream capacitors.

Determination of State of ECU 11

The relationship between states of the ECU 11 and the output voltages of the upstream extraction circuit Ai and the downstream extraction circuit Bi is similar to the relationship between states of the ECU 11 and the output voltages of the upstream extraction circuit A1 and the downstream extraction circuit B1 (see FIG. 6). Therefore, when the output voltages of the upstream extraction circuit Ai and the downstream extraction circuit Bi are both below the upper threshold Vp, or greater than or equal to the upper threshold Vp, the microcomputer 20 determines that the state of the ECU 11 is a normal state. When the output voltage of the upstream extraction circuit Ai is greater than or equal to the upper threshold Vp and furthermore the output voltage of the downstream extraction circuit Bi is below the upper threshold Vp, the microcomputer 20 determines that the fuse Fi is blown.

As long as a failure has not occurred in the upstream extraction circuit Ai or the downstream extraction circuit Bi, the state of the ECU 11 does not transition to a state in which the output voltage of the upstream extraction circuit Ai is below the upper threshold Vp and furthermore the output voltage of the downstream extraction circuit Bi is greater than or equal to the upper threshold Vp. Accordingly, when the output voltage of the upstream extraction circuit Ai is below the upper threshold Vp and furthermore the output voltage of the downstream extraction circuit Bi is greater than or equal to the upper threshold Vp, the microcomputer 20 determines that a failure has occurred in the upstream extraction circuit Ai or the downstream extraction circuit Bi.

Operation of Microcomputer 20

The microcomputer 20 executes blowout detection processing to detect blowout of the fuse Fi, by executing a computer program. When the upstream switch Gi is on, the microcomputer 20 executes blowout detection processing for the fuse Fi. If the microcomputer 20 includes two or more processing elements, the processing elements may execute the blowout detection processing for the fuses F1, F2, . . . in cooperation with each other.

The blowout detection processing for the fuse Fi is similar to the blowout detection processing for the fuse F1 in the first embodiment. In the description of the blowout detection processing of the fuse F1 in the first embodiment, replace the upstream extraction circuit A1, the downstream extraction circuit B1, and the fuse F1 respectively with the upstream extraction circuit Ai, the downstream extraction circuit Bi, and the fuse Fi. This therefore obtains a description of blowout detection processing for the fuse Fi. In the blowout detection processing for the fuse Fi, the microcomputer 20 determines whether or not the fuse Fi is blown based on the upstream voltage and the downstream voltage of the fuse Fi.

Effects of ECU 11

The ECU 11 in the third embodiment has effects similar to those of the ECU 11 in the first embodiment.

Fourth Embodiment

In the first embodiment, the upstream extraction circuit A1 and the downstream extraction circuit B1 may each have a configuration in which the diode 52 is omitted.

The following description of a fourth embodiment focuses on differences from the first embodiment. Configurations other than those described below are the same as those of the first embodiment, and constituent elements that are the same as those of the first embodiment are denoted by the same reference signs as in the first embodiment and will not be described.

Configuration of Upstream Extraction Circuit A1

Figure 11:
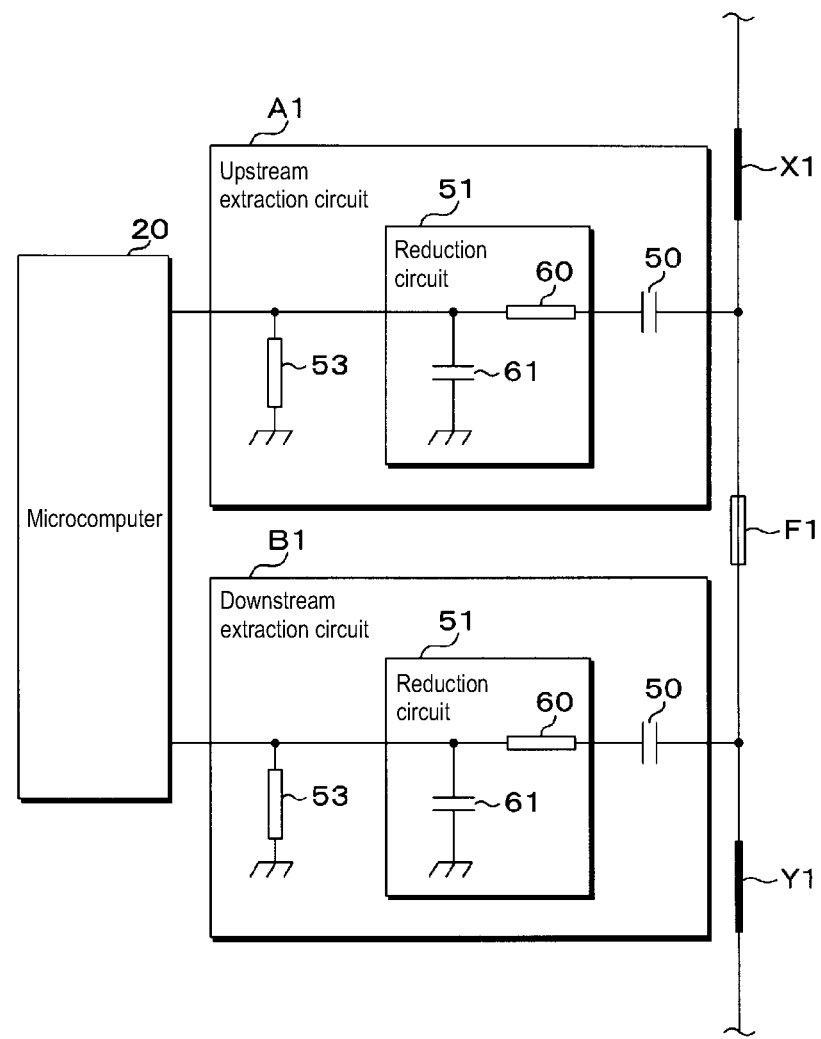
FIG. 11 is a circuit diagram of the upstream extraction circuit in a fourth embodiment.

FIG. 11 is a circuit diagram of the upstream extraction circuit A1 in the fourth embodiment. The configuration of the upstream extraction circuit A1 in the fourth embodiment is the same as the configuration of the upstream extraction circuit A1 in the first embodiment except that the diode 52 is omitted.

FIG. 12 is a waveform diagram for describing operation of the upstream extraction circuit A1. FIG. 12 shows the waveform of the upstream node voltage, the waveform of the upstream voltage that passed through the first capacitor 50, and the waveform of the upstream voltage that passed through the reduction circuit 51. Time is shown on the horizontal axis of these waveforms. These waveforms are the same as those shown in FIG. 4. The first capacitor 50 and the reduction circuit 51 operate similarly to the corresponding elements in the first embodiment. Therefore, the reduction circuit 51 reduces the peak value (absolute value) of the upstream voltage that passed through the first capacitor 50. As a result, this prevents a voltage with a large absolute value from being applied to the microcomputer 20. The reduction circuit 51 outputs the upstream voltage whose peak value was reduced to the microcomputer 20.

Configuration of Downstream Extraction Circuit B1

As shown in FIG. 11, the downstream extraction circuit B1 has a configuration similar to that of the upstream extraction circuit A1. The upstream extraction circuit A1, the upstream node, the upstream node voltage, and the upstream voltage respectively correspond to the downstream extraction circuit B1, the downstream node, the downstream node voltage, and the downstream voltage.

Method for Detecting Blowout of Fuse F1

As described above, the diode 52 is omitted from both the upstream extraction circuit A1 and the downstream extraction circuit B1. Therefore, when the upstream node voltage decreases, the upstream voltage also decreases. Similarly if the downstream node voltage decreases, the downstream voltage also decreases.

As mentioned in the description of the first embodiment, when the fuse F1 is blown, the upstream voltage increases, and the downstream voltage decreases. Therefore, if the upstream voltage is greater than or equal to the upper threshold and furthermore the downstream voltage is below a certain lower threshold, the microcomputer 20 detects blowout of the fuse F1. The lower threshold is a negative value. As mentioned in the description of the first embodiment, the upper threshold is a positive value. The upper threshold thus is higher than the lower threshold. In FIG. 12, the upper threshold and the lower threshold are indicated by Vp and Vn, respectively.

Determination of State of ECU 11

FIG. 13 is a chart showing the relationship between states of the ECU 11 and output voltages of the upstream extraction circuit A1 and the downstream extraction circuit B1. When the output voltages of the upstream extraction circuit A1 and the downstream extraction circuit B1 are both greater than or equal to the lower threshold Vn and furthermore below the upper threshold Vp, the microcomputer 20 determines that the state of the ECU 11 is a normal state. Similarly to the first embodiment, when the output voltages of the upstream extraction circuit A1 and the downstream extraction circuit B1 are both greater than or equal to the upper threshold Vp, or below the lower threshold Vn, the microcomputer 20 determines that the state of the ECU 11 is a normal state.

When the output voltage of the upstream extraction circuit A1 is greater than or equal to the upper threshold Vp and furthermore the output voltage of the downstream extraction circuit B1 is below the lower threshold Vn, the microcomputer 20 determines that the fuse F1 is blown.

A first state is a state in which the output voltage of the upstream extraction circuit A1 is greater than or equal to the lower threshold Vn and furthermore below the upper threshold Vp, and also the output voltage of the downstream extraction circuit B1 is below the lower threshold Vn or greater than or equal to the upper threshold Vp. A second state is a state in which the output voltage of the upstream extraction circuit A1 is below the lower threshold Vn or greater than or equal to the upper threshold Vp, and also the output voltage of the downstream extraction circuit B1 is greater than or equal to the lower threshold Vn and below the upper threshold Vp. A third state is a state in which the output voltage of the upstream extraction circuit A1 is below the lower threshold Vn and furthermore the output voltage of the downstream extraction circuit B1 is greater than or equal to the upper threshold Vp.

As long as a failure has not occurred in the upstream extraction circuit A1 or the downstream extraction circuit B1, the state of the ECU 11 will not transition to the first state, the second state, or the third state. Therefore, when the state of the ECU 11 is the first state, the second state, or the third state, the microcomputer 20 determines that a failure has occurred in the upstream extraction circuit A1 or the downstream extraction circuit B1.

Operation of Microcomputer 20

The microcomputer 20 executes blowout detection processing similarly to the first embodiment (see FIG. 7). In steps S3 and S5 of the blowout detection processing, the microcomputer 20 makes determinations according to the chart in FIG. 13. Therefore, when the output voltage of the upstream extraction circuit A1 is greater than or equal to the upper threshold Vp and furthermore the output voltage of the downstream extraction circuit B1 is below the lower threshold Vn, the microcomputer 20 determines that the fuse F1 is blown. The output voltage of the upstream extraction circuit A1 is the upstream voltage that passed through the first capacitor 50 of the upstream extraction circuit A1, and is the upstream voltage whose peak value was reduced by the reduction circuit 51 of the upstream extraction circuit A1. The output voltage of the downstream extraction circuit B1 is the downstream voltage that passed through the first capacitor 50 of the downstream extraction circuit B1, and is the downstream voltage whose peak value was reduced by the reduction circuit 51 of the downstream extraction circuit B1.

Effects of ECU 11

The ECU 11 in the fourth embodiment has effects similar to those of the ECU 11 in the first embodiment.

Variations of Second and Third Embodiments

In the second embodiment, the upstream extraction circuit A1 and the downstream extraction circuits B1, B2, . . . may each have a configuration in which the diode 52 is omitted, similarly to the fourth embodiment. In this case, the microcomputer 20 determines whether or not the fuse Fi is blown and whether or not a failure has occurred in the upstream extraction circuit A1 or the downstream extraction circuit Bi in a manner similar to the fourth embodiment. In this case, the chart in FIG. 13 shows the relationship between states of the ECU 11 and output voltages of the upstream extraction circuit A1 and the downstream extraction circuit Bi. In FIG. 13, "blowout" indicates blowout of the fuse Fi. In FIG. 13, "failure" indicates a failure in the upstream extraction circuit A1 or the downstream extraction circuit Bi.

Similarly, in the third embodiment, the upstream extraction circuits A1, A2, . . . and the downstream extraction circuits B1, B2, . . . may each have a configuration in which the diode 52 is omitted, similarly to the fourth embodiment. In this case, the microcomputer 20 determines whether or not the fuse Fi is blown and whether or not a failure has occurred in the upstream extraction circuit Ai or the downstream extraction circuit Bi in a manner similar to the fourth embodiment. In this case, the chart in FIG. 13 shows the relationship between states of the ECU 11 and output voltages of the upstream extraction circuit Ai and the downstream extraction circuit Bi. In FIG. 13, "blowout" indicates blowout of the fuse Fi. In FIG. 13, "failure"

indicates a failure in the upstream extraction circuit Ai or the downstream extraction circuit Bi.

Fifth Embodiment

In the first embodiment, the microcomputer 20 detects blowout of the fuse F1. However, a device different from the microcomputer 20 may detect blowout of the fuse F1.

The following description of a fifth embodiment focuses on differences from the first embodiment. Configurations other than those described below are the same as those of the first embodiment, and constituent elements that are the same as those of the first embodiment are denoted by the same reference signs as in the first embodiment and will not be described.

Configuration of Power Supply System 1

Figure 14:
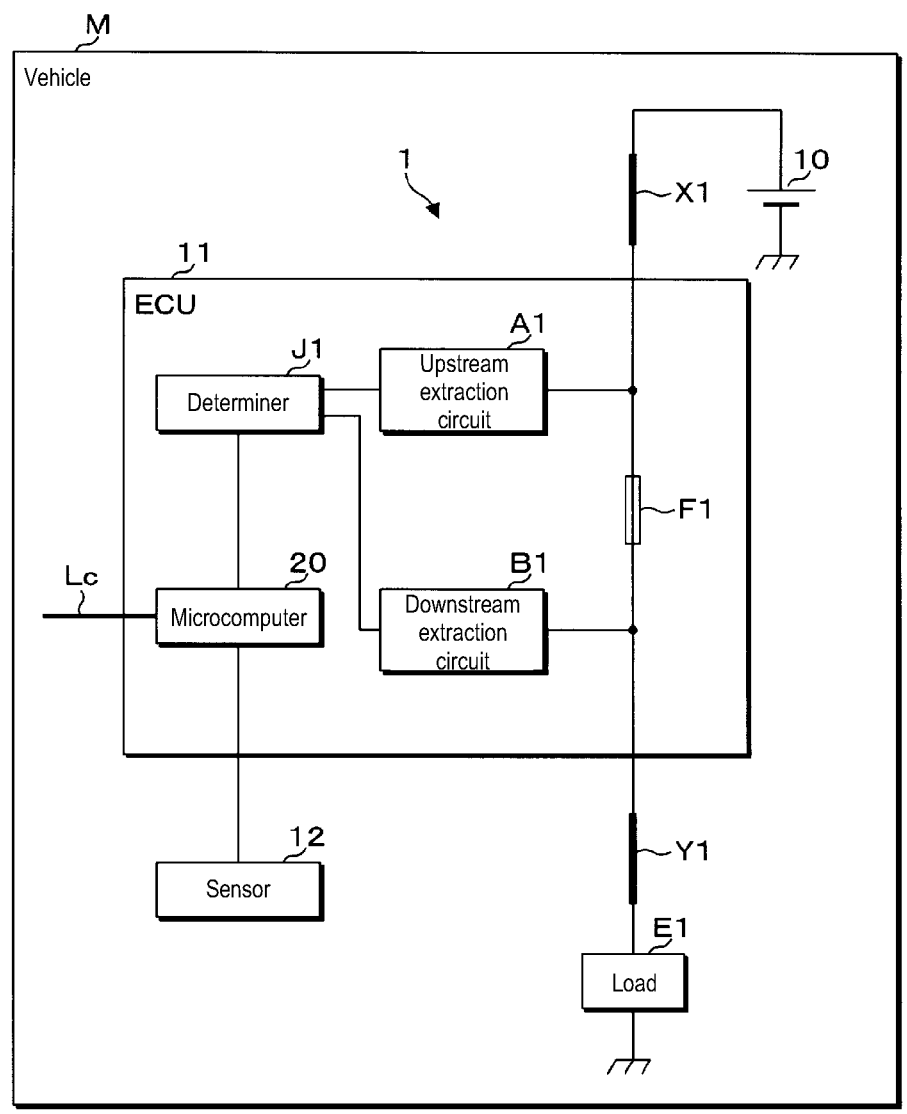
FIG. 14 is a block diagram showing a main configuration of the power supply system in a fifth embodiment.

FIG. 14 is a block diagram showing the main configuration of the power supply system 1 in the fifth embodiment. Similarly to the first embodiment, the ECU 11 in the fifth embodiment includes the microcomputer 20, the upstream extraction circuit A1, the downstream extraction circuit B1, and the fuse F1. The ECU 11 in the fifth embodiment further includes a determination circuit J1. The upstream extraction circuit A1 and the downstream extraction circuit B1 are each connected to the determination circuit J1 instead of the microcomputer 20. The determination circuit J1 is also connected to the microcomputer 20.

Similarly to the first embodiment, the upstream extraction circuit A1 extracts the AC component of the upstream node voltage, that is to say the upstream voltage, from the upstream node voltage. Similarly to the first embodiment, the downstream extraction circuit B1 extracts the AC component of the downstream node voltage, that is to say the downstream voltage, from the downstream node voltage. The determination circuit J1 determines whether or not the fuse F1 is blown based on the upstream voltage and the downstream voltage respectively extracted by the upstream extraction circuit A1 and the downstream extraction circuit B1. The determination circuit J1 notifies the microcomputer 20 of the determination result. When the microcomputer 20 is notified that the fuse F1 is blown, the microcomputer 20 transmits the blowout signal to a communication device via the communication line Lc.

Circuit Diagram of Upstream Extraction Circuit A1, Downstream Extraction Circuit B1, and Determination Circuit J1

Figure 15:
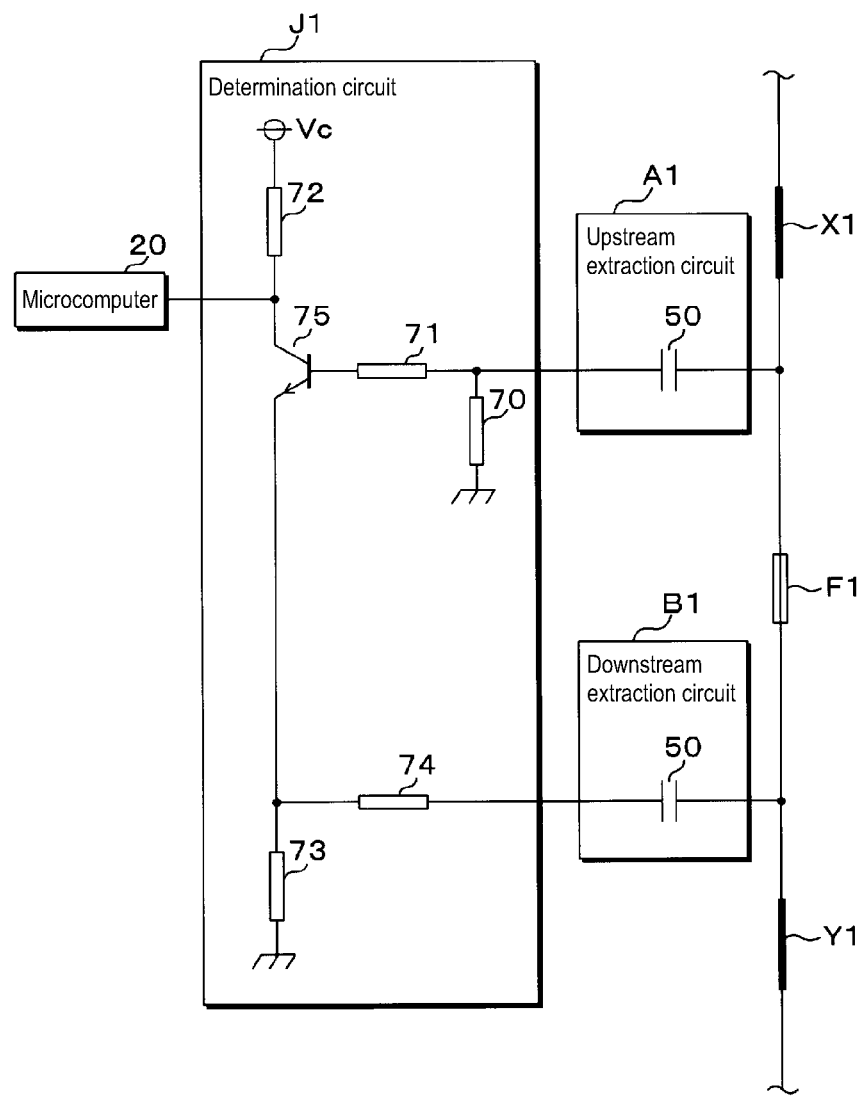
FIG. 15 is a circuit diagram of the upstream extraction circuit, the downstream extraction circuit, and a determination circuit.

FIG. 15 shows a circuit diagram of the upstream extraction circuit A1, the downstream extraction circuit B1, and the determination circuit J1. The upstream extraction circuit A1 includes the first capacitor 50, similarly to the first embodiment. One end of the first capacitor 50 of the upstream extraction circuit A1 is connected to the upstream node of the fuse F1. The other end of the first capacitor 50 of the upstream extraction circuit A1 is connected to the determination circuit J1. Similarly to the first embodiment, the first capacitor 50 of the upstream extraction circuit A1 extracts the AC component of the upstream node voltage, that is to say the upstream voltage (see FIG. 5). The first capacitor 50 of the upstream extraction circuit A1 outputs the extracted upstream voltage to the determination circuit J1. When the fuse F1 is blown, the upstream voltage rises to a voltage greater than or equal to the upper threshold. As mentioned in the description of the first embodiment, the upper threshold is a positive value.

The downstream extraction circuit B1 includes the first capacitor 50, similarly to the first embodiment. One end of the first capacitor 50 of the downstream extraction circuit B1 is connected to the downstream node of the fuse F1. The other end of the first capacitor 50 of the downstream extraction circuit B1 is connected to the determination circuit J1. Similarly to the first embodiment, the first capacitor 50 of the downstream extraction circuit B1 extracts the AC component of the downstream node voltage, that is to say the downstream voltage. The first capacitor 50 of the downstream extraction circuit B1 outputs the extracted downstream voltage to the determination circuit J1. If the fuse F1 is blown, the downstream voltage drops to a voltage below a certain lower threshold. Similarly to the fourth embodiment, the lower threshold is a negative value.

The determination circuit J1 includes an input resistor 70, a control resistor 71, an upstream resistor 72, a downstream resistor 73, a limiting resistor 74, and a circuit switch 75. The circuit switch 75 is an NPN type bipolar transistor. The other end of the first capacitor 50 of the upstream extraction circuit A1 is connected to one end of the input resistor 70 and the control resistor 71. The other end of the input resistor 70 is grounded. The other end of the control resistor 71 is connected to the base of circuit switch 75.

The collector of the circuit switch 75 is connected to one end of the upstream resistor 72. A constant voltage Vc is applied to the other end of the upstream resistor 72. The upstream resistor 72 functions as a first resistor. The constant voltage Vc has a positive value, and is generated by a regulator stepping down the power supply voltage of the DC power supply 10, for example. The connection node between the upstream resistor 72 and the collector of the circuit switch 75 is connected to the microcomputer 20. The emitter of the circuit switch 75 is connected to one end of the downstream resistor 73. The other end of the downstream resistor 73 is grounded. The other end of the first capacitor 50 of the downstream extraction circuit B1 is connected to one end of the limiting resistor 74. The other end of the limiting resistor 74 is connected to the connection node between the downstream resistor 73 and the emitter of the circuit switch 75.

The upstream voltage that passed through the first capacitor 50 of the upstream extraction circuit A1 is applied across the input resistor 70. The voltage across input resistor 70 is applied to the base of the circuit switch 75. The downstream voltage that passed through the first capacitor 50 of the downstream extraction circuit B1 is applied across the downstream resistor 73 via the limiting resistor 74. The limiting resistor 74 limits the magnitude of the current flowing through the first capacitor 50 of the downstream extraction circuit B1.

Regarding the circuit switch 75, when the voltage at the base, whose reference potential is the potential at the emitter, is greater than or equal to a certain ON voltage, the circuit switch 75 is on. When the circuit switch 75 is on, the resistance value between the collector and the emitter of the circuit switch 75 is sufficiently small. Therefore, current can flow through the collector and emitter of the circuit switch 75.

Regarding the circuit switch 75, if the voltage at the base, whose reference potential is the potential at the emitter, is below a certain OFF voltage, the circuit switch 75 is off. When the circuit switch 75 is off, the resistance value between the collector and the emitter of the circuit switch 75 is sufficiently large. Therefore, current does not flow through the collector and emitter of the circuit switch 75. The ON voltage is greater than or equal to the OFF voltage. The ON voltage and the OFF voltage are positive values.

The voltage at the connection node between the upstream resistor 72 and the collector of the circuit switch 75 is output from the determination circuit J1 to the microcomputer 20.

The reference potential of the output voltage of the determination circuit J1 is the ground potential. When the circuit switch 75 is off, current does not flow through the upstream resistor 72. Therefore, the constant voltage Vc is output from the determination circuit J1 to the microcomputer 20. When the circuit switch 75 is on, current flows through the upstream resistor 72, the circuit switch 75, and the downstream resistor 73 in this order. The path of current flowing through the upstream resistor 72 functions as a second current path. In the second current path, the circuit switch 75 is arranged downstream of the upstream resistor 72. In the second current path, the downstream resistor 73 is arranged downstream of the circuit switch 75. The downstream resistor 73 functions as a second resistor.

When the circuit switch 75 is on, the upstream resistor 72 and the downstream resistor 73 divide the constant voltage Vc. The divided voltage of the upstream resistor 72 and the downstream resistor 73 is output to the microcomputer 20. The divided voltage is expressed as Vc·R73/(R72+R73), where R72 and R73 are respectively the resistance values of the upstream resistor 72 and the downstream resistor 73. Here, "·" represents multiplication.

Since the constant voltage Vc and the resistance values R72 and R73 are constant values, the divided voltage is constant. Furthermore, since the resistance values R72 and R73 are positive values, the divided voltage is below the constant voltage Vc. A certain reference voltage is set in the microcomputer 20. The reference voltage is greater than the divided voltage and less than or equal to the constant voltage Vc. A voltage that is greater than or equal to the reference voltage will be referred to as a high-level voltage. A voltage that is below the reference voltage will be referred to as a low-level voltage. Therefore, when the circuit switch 75 is off, a high-level voltage is output from the determination circuit J1 to the microcomputer 20. When the circuit switch 75 is on, a low-level voltage is output from the determination circuit J1 to the microcomputer 20.

Operation of Determination Circuit J1

FIG. 16 is a chart for describing operation of the determination circuit J1. As described above, when the fuse F1 is blown, the upstream voltage increases to a voltage greater than or equal to the upper threshold Vp and furthermore the downstream voltage decreases to a voltage below the lower threshold Vn. The upstream voltage and the downstream voltage are the output voltages of the upstream extraction circuit A1 and the downstream extraction circuit B1, respectively. As shown in FIG. 16, when the output voltage of the upstream extraction circuit A1 is greater than or equal to the upper threshold Vp and furthermore the output voltage of the downstream extraction circuit B1 is below the lower threshold Vn, in the circuit switch 75, the voltage at the base, whose reference potential is the potential at the emitter, is greater than or equal to the ON voltage. Therefore, the circuit switch 75 is on, and a low-level voltage is output from the determination circuit J1.

When the output voltages of the upstream extraction circuit A1 and the downstream extraction circuit B1 are both greater than or equal to the upper threshold Vp, or below the lower threshold Vn, in the circuit switch 75, the voltage at the base, whose reference potential is the potential at the emitter, is a value that is near zero V and below the OFF voltage. In this case, regarding the circuit switch 75, the voltage at the base, whose reference potential is the potential at the emitter, is below the OFF voltage. Therefore, the circuit switch 75 is off, and a high-level voltage is output from the determination circuit J1.

When the output voltage of the upstream extraction circuit A1 is below the lower threshold Vn and furthermore the output voltage of the downstream extraction circuit B1 is greater than or equal to the upper threshold Vp, in the circuit switch 75, the voltage at the base, whose reference potential is the potential at the emitter, is a negative value and below the OFF voltage. Therefore, the circuit switch 75 is off, and a high-level voltage is output from the determination circuit J1.

As described above, the determination circuit J1 determines whether or not the fuse F1 is blown based on the output voltages of the upstream extraction circuit A1 and the downstream extraction circuit B1. In the case of determining that the fuse F1 is not blown, the determination circuit J1 outputs a high-level voltage to the microcomputer 20. In the case of determining that the fuse F1 is blown, the determination circuit J1 outputs a low-level voltage to the microcomputer 20. The microcomputer 20 is thus notified of blowout of the fuse F1. In the fifth embodiment, the determination circuit J1 functions as a determiner.

Effects of ECU 11

The ECU 11 in the fifth embodiment exhibits effects similar to those of the ECU 11 in the first embodiment, except for the effect obtained by the microcomputer 20 detecting a blowout.

Sixth Embodiment

In the second embodiment, the microcomputer 20 detects blowout of a plurality of fuses F1, F2, and so on. However, a device different from the microcomputer 20 may detect blowout of the fuses F1, F2, and so on.

The following description of a sixth embodiment focuses on differences from the second embodiment. Configurations other than those described below are the same as those of the second embodiment, and constituent elements that are the same as those of the second embodiment are denoted by the same reference signs similarly to the second embodiment and will not be described.

Configuration of Power Supply System 1

Figure 17:
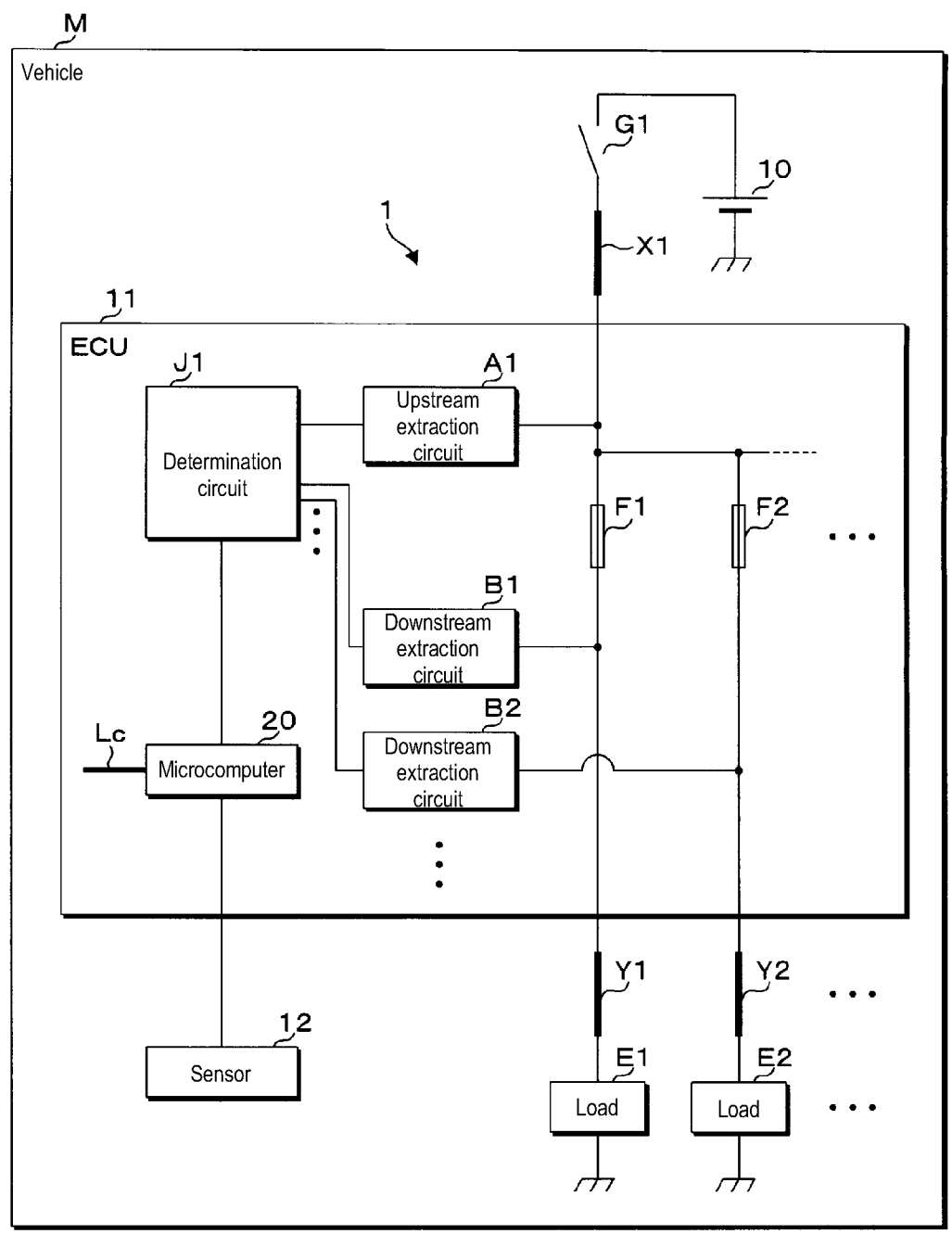
FIG. 17 is a block diagram showing a main configuration of the power supply system in a sixth embodiment.

FIG. 17 is a block diagram showing the main configuration of the power supply system 1 in the sixth embodiment. Similarly to the second embodiment, the ECU 11 in the sixth embodiment includes the microcomputer 20, the upstream extraction circuit A1, a plurality of downstream extraction circuits B1, B2, . . . , and a plurality of fuses F1, F2, and so on. The ECU 11 in the sixth embodiment further includes the determination circuit J1. The upstream extraction circuit A1 and the downstream extraction circuits B1, B2, . . . are each connected to the determination circuit J1 instead of the microcomputer 20. The determination circuit J1 is also connected to the microcomputer 20.

The upstream extraction circuit A1 has a configuration similar to that in the fifth embodiment. The downstream extraction circuit Bi has a configuration similar to that of the downstream extraction circuit Bi in the fifth embodiment. As mentioned in the description of the second embodiment, "i" is a natural number. One end of the first capacitor 50 of the downstream extraction circuit Bi is connected to the downstream node of the fuse Fi. The upstream extraction circuit A1 outputs the AC component of the upstream node voltage, that is to say the upstream voltage, to the determination circuit J1. The downstream extraction circuit Bi outputs the AC component of the downstream node voltage of the fuse Fi, that is to say the downstream voltage of the fuse Fi, to the determination circuit J1.

he determination circuit J1 determines whether or not at least one of the fuses F1, F2, . . . is blown based on the upstream voltage received from the upstream extraction circuit A1 and the downstream voltages received from the downstream extraction circuits B1, B2, and so on. The determination circuit J1 notifies the microcomputer 20 of the determination result. Upon receiving a notification that at least one of the fuses F1, F2, . . . is blown, the microcomputer 20 transmits a blowout signal indicating that at least one of the fuses F1, F2, . . . is blown to a communication device via the communication line Lc.

Circuit Diagram of Determination Circuit J1

Figure 18:
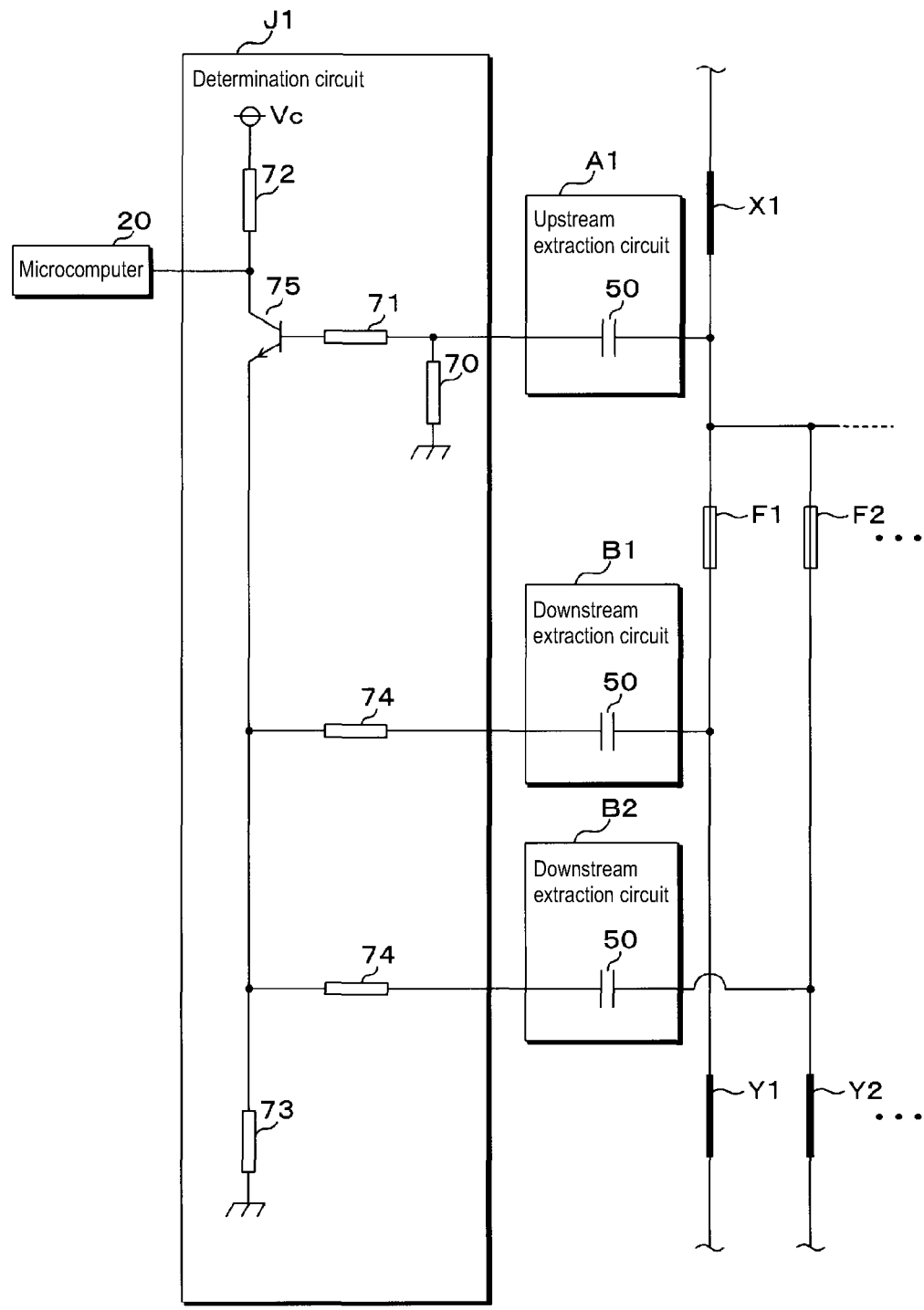
FIG. 18 is a circuit diagram of the determination circuit.

FIG. 18 is a circuit diagram of the determination circuit J1. Similarly to the fifth embodiment, the determination circuit J1 includes the input resistor 70, the control resistor 71, the upstream resistor 72, the downstream resistor 73, and the circuit switch 75. The connections of these elements are similar to the connections described in the fifth embodiment. The constant voltage Vc is applied to the upstream end of the upstream resistor 72. The connection node between the upstream resistor 72 and the collector of the circuit switch 75 is connected to the microcomputer 20. The downstream end of the downstream resistor 73 is grounded.

The determination circuit J1 in the sixth embodiment further includes a plurality of limiting resistors 74. As described above, one end of the first capacitor 50 of the downstream extraction circuit Bi is connected to the downstream node of the fuse Fi. The other end of each of the first capacitors 50 of the downstream extraction circuits B1, B2, . . . is connected to one end of the corresponding limiting resistor 74. Similarly to the fifth embodiment, the other end of each of the limiting resistors 74 is connected to the connection node between the downstream resistor 73 and the emitter of the circuit switch 75.

When none of the fuses F1, F2, . . . is blown, in the circuit switch 75, the voltage at the base, whose reference potential is the potential at the emitter, is below the OFF voltage. At this time, the circuit switch 75 is off. When the circuit switch 75 is off, the determination circuit J1 outputs a high-level voltage.

When at least one of the fuses F1, F2, . . . is blown, the output voltage of the upstream extraction circuit A1 increases to a voltage greater than or equal to the upper threshold. Furthermore, the output voltage of at least one of the downstream extraction circuits B1, B2, . . . decreases to a voltage below the lower threshold. At this time, the circuit switch 75 is turned on, and a low-level voltage is output from the determination circuit J1. The output voltage of the upstream extraction circuit A1 is the upstream voltage. The output voltage of the downstream extraction circuit Bi is the downstream voltage of the fuse Fi.

As described above, the determination circuit J1 determines whether or not at least one of the fuses F1, F2, . . . is blown based on the output voltages of the upstream extraction circuit A1, and the downstream extraction circuits B1, B2, and so on. In the case of determining that none of the fuses F1, F2, . . . are blown, the determination circuit J1 outputs a high-level voltage to the microcomputer 20. In the case of determining that at least one of the fuses F1, F2, . . . is blown, the determination circuit J1 outputs a low-level voltage to the microcomputer 20. The microcomputer 20 is thus notified that at least one of the fuses F1, F2, . . . is blown. In the sixth embodiment as well, the determination circuit J1 functions as a determiner.

Effects of ECU 11

The ECU 11 in the sixth embodiment achieves effects similar to those of the ECU 11 in the second embodiment, except for the effect obtained by the microcomputer 20 detecting a blowout.

Seventh Embodiment

In the third embodiment, the microcomputer 20 detects blowout of the fuse Fi. However, a device different from the microcomputer 20 may detect blowout of the fuse Fi. As mentioned in the description of the second embodiment, "i" is a natural number.

The following description of a seventh embodiment focuses on differences from the third embodiment. Configurations other than those described below are the same as those of the third embodiment, and constituent elements that are the same as those of the third embodiment are denoted by the same reference signs as in the third embodiment and will not be described.

Configuration of Power Supply System 1

Figure 19:
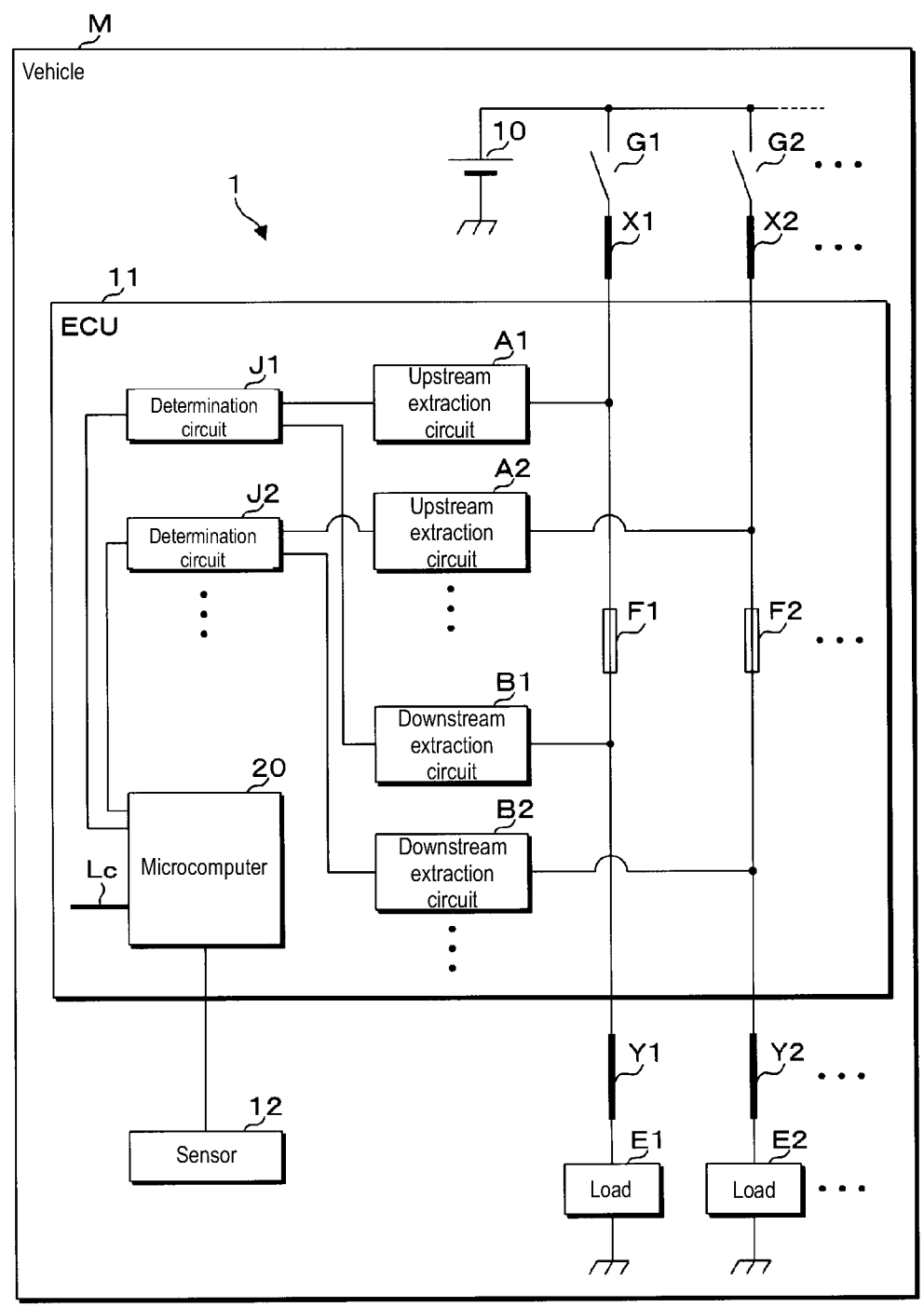
FIG. 19 is a block diagram showing a main configuration of the power supply system in a seventh embodiment.

FIG. 19 is a block diagram showing the main configuration of the power supply system 1 in the seventh embodiment. Similarly to the third embodiment, the ECU 11 in the seventh embodiment includes the microcomputer 20, a plurality of upstream extraction circuits A1, A2, . . . , a plurality of downstream extraction circuits B1, B2, . . . , and a plurality of the fuses F1, F2, and so on. The ECU 11 in the seventh embodiment further includes a plurality of determination circuits J1, J2, and so on. The upstream extraction circuit Ai and the downstream extraction circuit Bi are each connected to the determination circuit Ji instead of the microcomputer 20. The determination circuit Ji is also connected to the microcomputer 20.

The upstream extraction circuit Ai has a configuration similar to that of the upstream extraction circuit A1 in the fifth embodiment. The downstream extraction circuit Bi has a configuration similar to that of the downstream extraction circuit B1 in the fifth embodiment. One end of the first capacitor 50 of the upstream extraction circuit Ai is connected to the upstream node of the fuse Fi. One end of the first capacitor 50 of the downstream extraction circuit Bi is connected to the downstream node of the fuse Fi. The upstream extraction circuit Ai outputs the AC component of the upstream node voltage of the fuse Fi, that is to say the upstream voltage of the fuse Fi, to the determination circuit Ji. The downstream extraction circuit Bi outputs the AC component of the downstream node voltage of the fuse Fi, that is to say the downstream voltage of the fuse Fi, to the determination circuit Ji.

The determination circuit Ji has a configuration similar to that of the determination circuit J1 in the fifth embodiment, and determines whether or not the fuse Fi is blown based on the output voltages of the upstream extraction circuit Ai and the downstream extraction circuit Bi. In the case of determining that the fuse Fi is not blown, the determination circuit Ji outputs a high-level voltage to the microcomputer 20. In the case of determining that the fuse Fi is blown, the determination circuit Ji outputs a low-level voltage to the microcomputer 20. The microcomputer 20 is thus notified of blowout of the fuse Fi. In the seventh embodiment, the determination circuit Ji functions as a determiner.

Effects of ECU 11

The ECU 11 in the seventh embodiment exhibits effects similar to those of the ECU 11 in the third embodiment, except for the effect obtained by the microcomputer 20 detecting a blowout.

Variations of Fifth to Seventh Embodiments

In the fifth embodiment, the upstream extraction circuit A1 and the downstream extraction circuit B1 may have configurations similar to those of the upstream extraction circuit A1 and the downstream extraction circuit B1 in the first embodiment or the fourth embodiment. In the sixth embodiment, the upstream extraction circuit A1 and the downstream extraction circuit Bi may have configurations similar to those of the upstream extraction circuit A1 and the downstream extraction circuit B1 in the first embodiment or the fourth embodiment. In the seventh embodiment, the upstream extraction circuit Ai and the downstream extraction circuit Bi may have configurations similar to those of the upstream extraction circuit A1 and the downstream extraction circuit B1 in the first embodiment or the fourth embodiment.

In the fifth and sixth embodiments, the circuit switch 75 of the determination circuit J1 is not limited to being an NPN type bipolar transistor, and may also be an N-channel type FET (Field Effect Transistor) or an IGBT (Insulated Gate Bipolar Transistor), for example. In the seventh embodiment, the circuit switch 75 of the determination circuit Ji is not limited to being an NPN bipolar transistor, and may be an N-channel FET, an IGBT, or the like.

Eighth Embodiment

In the first embodiment, the reduction circuit 51 is not limited to being a circuit that includes the second circuit resistor 60.

The following description of an eighth embodiment focuses on differences from the first embodiment. Configurations other than those described below are the same as those of the first embodiment, and constituent elements that are the same as those of the first embodiment are denoted by the same reference signs as in the first embodiment and will not be described.

Configuration of Upstream Extraction Circuit A1

Figure 20:
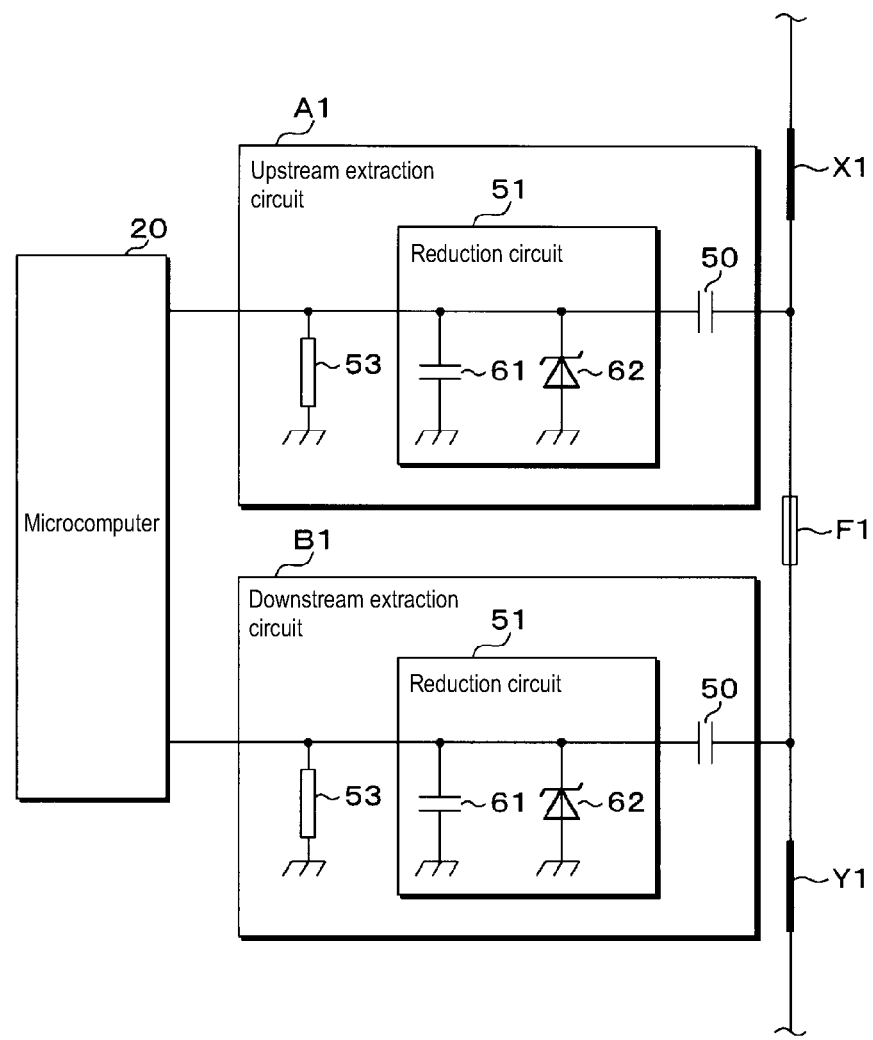
FIG. 20 is a circuit diagram of the upstream extraction circuit in an eighth embodiment.

FIG. 20 is a circuit diagram of the upstream extraction circuit A1 in the eighth embodiment. Similarly to the first embodiment, the upstream extraction circuit A1 in the eighth embodiment includes the first capacitor 50, the reduction circuit 51, and the first circuit resistor 53. The reduction circuit 51 in the eighth embodiment includes the second capacitor 61 and a first Zener diode 62.

One end of the first capacitor 50 is connected to the upstream node of the fuse F1. In the reduction circuit 51, the other end of the first capacitor 50 is connected to the microcomputer 20, one end of the first circuit resistor 53, one end of the second capacitor 61, and the cathode of the first Zener diode 62. The other end of the first circuit resistor 53, the other end of the second capacitor 61, and the anode of the first Zener diode 62 are grounded.

Figure 21:
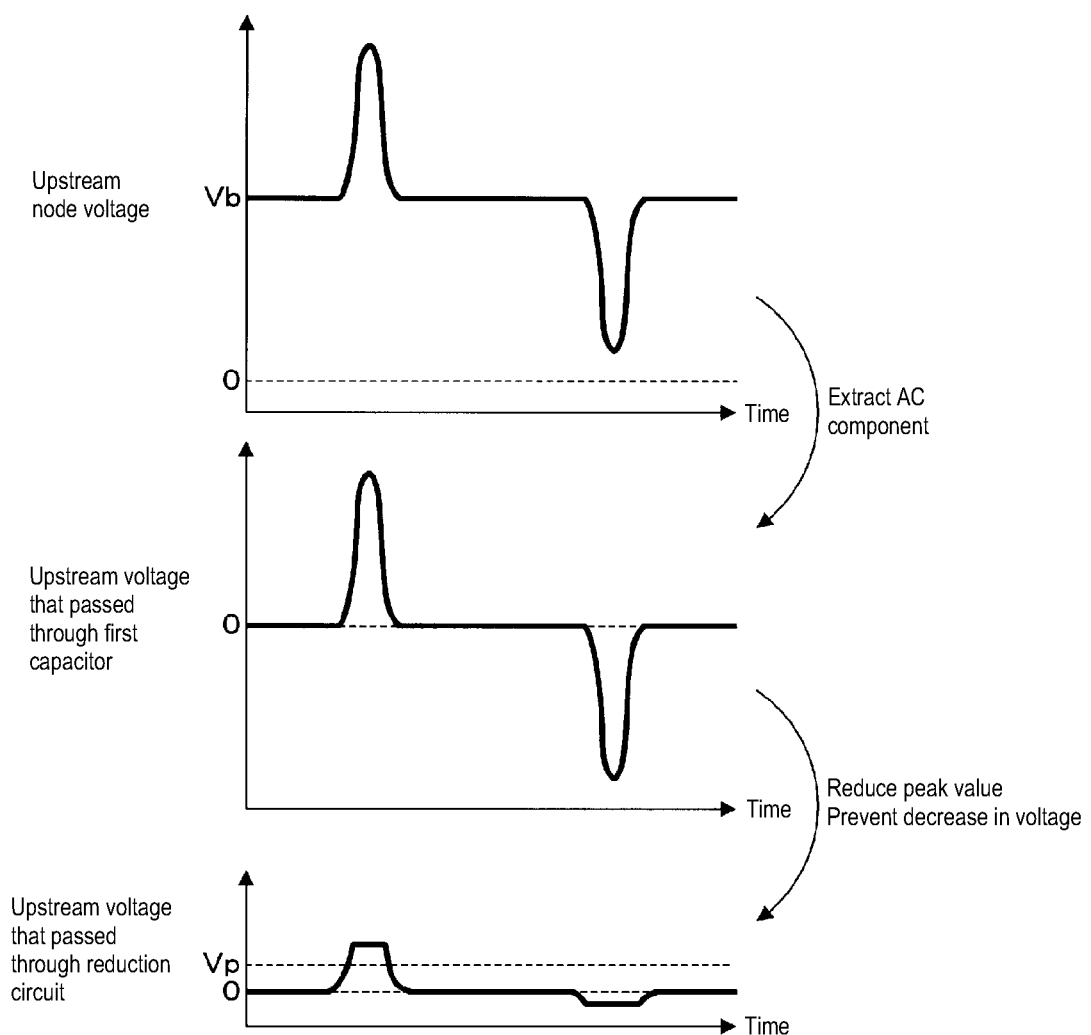
FIG. 21 is a waveform diagram for describing operation of the upstream extraction circuit.

FIG. 21 is a waveform diagram for describing operation of the upstream extraction circuit A1. FIG. 21 shows the waveform of the upstream node voltage, the waveform of the upstream voltage that passed through the first capacitor 50, and the waveform of the upstream voltage that passed through the reduction circuit 51. Time is shown on the horizontal axis of these waveforms. Similarly to the first embodiment, the first capacitor 50 extracts the AC component of the upstream node voltage, that is to say the upstream voltage. The upstream voltage that passed through the first capacitor 50 is applied across the second capacitor 61 of the reduction circuit 51. The second capacitor 61 smoothes the voltage applied thereto via the second circuit resistor 60.

In the first Zener diode 62 of the reduction circuit 51, when the voltage at the cathode, whose reference potential is the ground potential, reaches a certain breakdown voltage, current flows through the cathode and the anode in this order. This prevents the upstream voltage from exceeding the breakdown voltage. The breakdown voltage is greater than or equal to the upper threshold Vp. Also, the first Zener diode 62 operates similarly to the diode 52 in the first embodiment. The upstream voltage is thus prevented from dropping to a voltage below a predetermined voltage. The upstream voltage whose peak value was reduced by the reduction circuit 51 is applied across the first circuit resistor 53. The upstream voltage applied across the first circuit resistor 53 is output to the microcomputer 20. Due to the operation of the first Zener diode 62 of the reduction circuit 51, the voltage input to the microcomputer 20 falls within an allowable range. In the eighth embodiment, the first Zener diode 62 of the upstream extraction circuit A1 functions as the upstream diode.

Configuration of Downstream Extraction Circuit B1

As shown in FIG. 20, the downstream extraction circuit B1 has a configuration similar to that of the upstream extraction circuit A1. In the description of the configuration of the upstream extraction circuit A1, replace the upstream extraction circuit A1, the upstream node voltage, and the upstream voltage respectively with the downstream extraction circuit B1, the downstream node voltage, and the downstream voltage. This therefore obtains a description of the configuration of the downstream extraction circuit B1. In the eighth embodiment, the first Zener diode 62 of the downstream extraction circuit B1 functions as the downstream diode.

Effects of ECU 11

The ECU 11 in the eighth embodiment achieves effects similar to those of the ECU 11 in the first embodiment.

Variations of Second and Third Embodiments

The upstream extraction circuit A1 and the downstream extraction circuit B1 in the second embodiment may have configurations similar to those of the upstream extraction circuit A1 and the downstream extraction circuit B1 in the eighth embodiment. The upstream extraction circuit A1 and the downstream extraction circuit Bi in the third embodiment may have configurations similar to those of the upstream extraction circuit A1 and the downstream extraction circuit B1 in the eighth embodiment.

Ninth Embodiment

In the fourth embodiment, the reduction circuit 51 is not limited to being a circuit that includes the second circuit resistor 60.

The following description of a ninth embodiment focuses on differences from the fourth embodiment. Configurations other than those described below are the same as those of the fourth embodiment, and constituent elements that are the same as those of the fourth embodiment are denoted by the same reference signs similarly to the fourth embodiment and will not be described.

Configuration of Upstream Extraction Circuit A1

Figure 22:
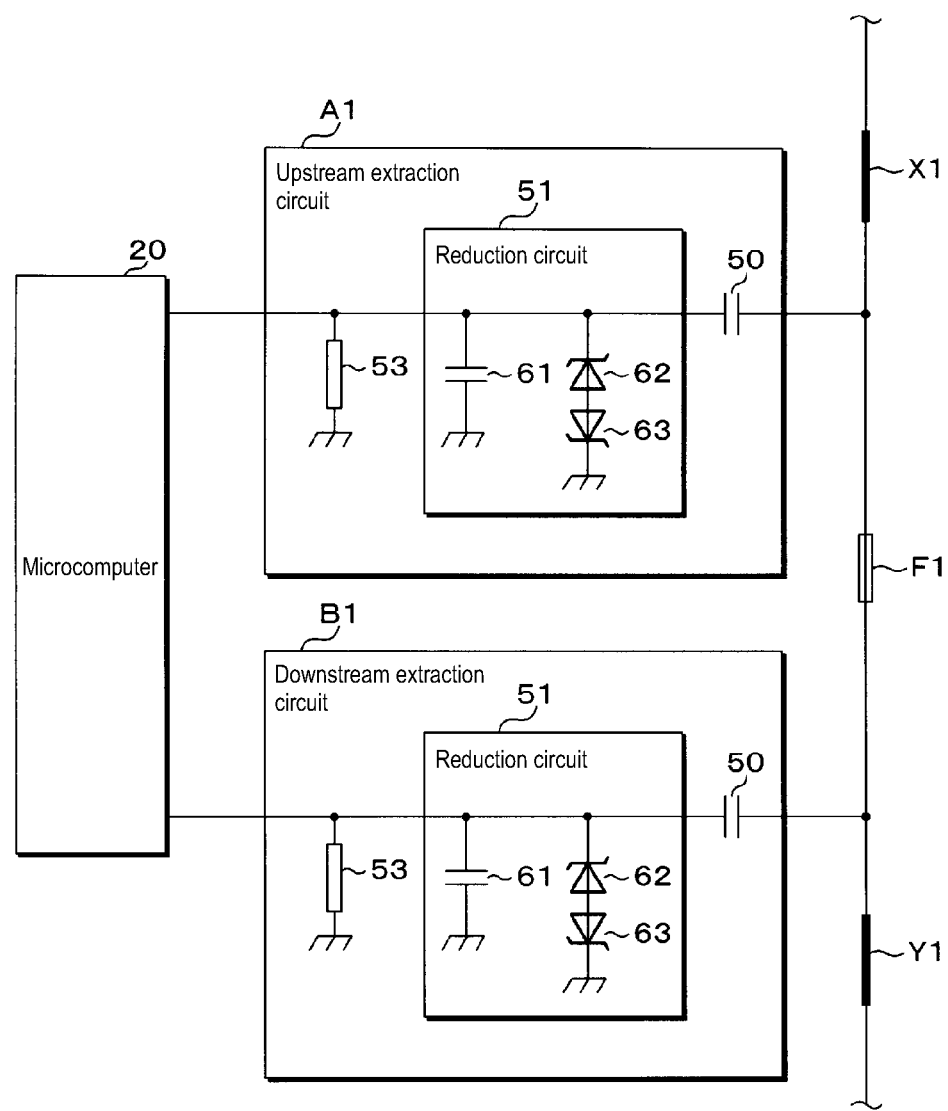
FIG. 22 is a circuit diagram of the upstream extraction circuit in a ninth embodiment.

FIG. 22 is a circuit diagram of the upstream extraction circuit A1 in the ninth embodiment. The upstream extraction circuit A1 in the ninth embodiment has constituent elements similar to those of the upstream extraction circuit A1 in the eighth embodiment. The connections of these elements are similar to the connections described in the eighth embodiment. The upstream extraction circuit A1 in the eighth embodiment further includes a second Zener diode 63. The anode of the second Zener diode 63 is connected to the anode of the first Zener diode 62. The cathode of the second Zener diode 63 is grounded.

Figure 23:
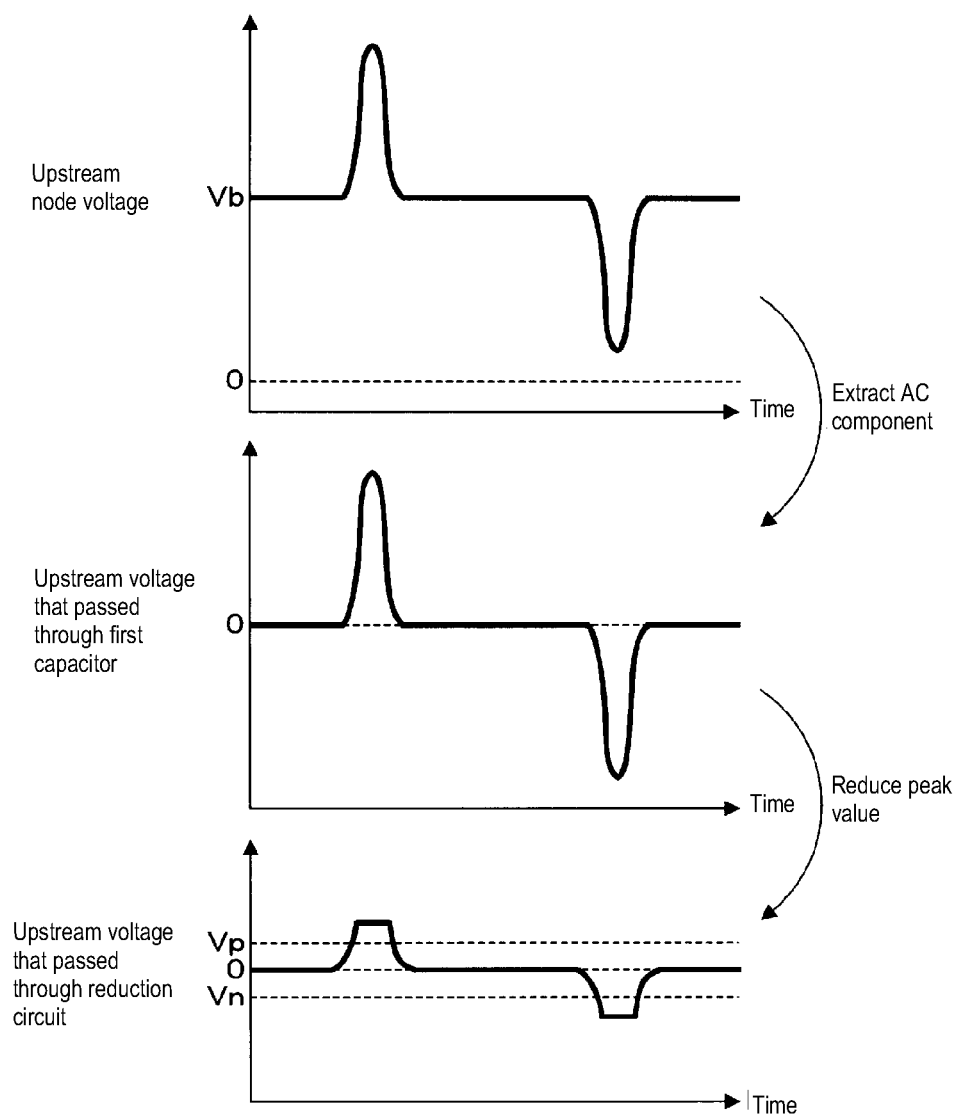
FIG. 23 is a waveform diagram for describing operation of the upstream extraction circuit.

FIG. 23 is a waveform diagram for describing operation of the upstream extraction circuit A1. FIG. 21 shows the waveform of the upstream node voltage, the waveform of the upstream voltage that passed through the first capacitor 50, and the waveform of the upstream voltage that passed through the reduction circuit 51. Time is shown on the horizontal axis of these waveforms. Similarly to the first embodiment, the first capacitor 50 extracts the AC component of the upstream node voltage, that is to say the upstream voltage. The upstream voltage that passed through the first capacitor 50 is applied across the second capacitor 61 of the reduction circuit 51. The second capacitor 61 smoothes the voltage applied thereto via the second circuit resistor 60.

Hereinafter, a circuit in which the first Zener diode 62 and the second Zener diode 63 are connected in series will be referred to as a diode circuit. In the diode circuit, when the upstream voltage rises to a certain first voltage that is a positive value, current flows through the diode circuit, and the upstream voltage does not exceed a first voltage. The first voltage is greater than or equal to the upper threshold Vp. In the diode circuit, when the upstream voltage decreases to a certain second voltage that is a negative value, current flows through the diode circuit, and the upstream voltage does not decrease to a voltage below the second voltage. The second voltage is below the lower threshold Vn.

The upstream voltage whose peak value was reduced by the reduction circuit 51 is applied across the first circuit resistor 53. The upstream voltage applied across the first circuit resistor 53 is output to the microcomputer 20. Due to the operation of the first Zener diode 62 of the reduction circuit 51, the voltage input to the microcomputer 20 falls within an allowable range.

Configuration of Downstream Extraction Circuit B1

As shown in FIG. 22, the downstream extraction circuit B1 has a configuration similar to that of the upstream extraction circuit A1. In the description of the configuration of the upstream extraction circuit A1, replace the upstream extraction circuit A1, the upstream node voltage, and the upstream voltage respectively with the downstream extraction circuit B1, the downstream node voltage, and the downstream voltage. This therefore obtains a description of the configuration of the downstream extraction circuit B1.

Effects of ECU 11

The ECU 11 in the ninth embodiment has effects similar to those of the ECU 11 in the fourth embodiment.

Variation of Ninth Embodiment

The diode circuit may be a circuit in which the cathode of the first Zener diode 62 is connected to the cathode of the second Zener diode 63. In this case, the anode of the first Zener diode 62 is connected to the other end of the first capacitor 50. The anode of the second Zener diode 63 is grounded. Also, in the reduction circuit 51, a suppressor, a varistor, or the like may be used instead of the diode circuit. These elements operate similarly to the diode circuit.

Variations of Fourth to Seventh Embodiments

In the fourth and fifth embodiments, the upstream extraction circuit A1 and the downstream extraction circuit B1 may have configurations similar to those of the upstream extraction circuit A1 and the downstream extraction circuit B1 in the ninth embodiment. In the sixth embodiment, the upstream extraction circuit A1 and the downstream extraction circuit Bi may have configurations similar to those of the upstream extraction circuit A1 and the downstream extraction circuit B1 in the ninth embodiment. In the seventh embodiment, the upstream extraction circuit Ai and the downstream extraction circuit Bi may have configurations similar to those of the upstream extraction circuit A1 and the downstream extraction circuit B1 in the ninth embodiment.

Variations of First to Ninth Embodiments

In the first to ninth embodiments, one or more upstream extraction circuits and one or more downstream extraction circuits may output the output voltage to a multiplexer. In this case, the multiplexer notifies the microcomputer 20 of the output voltage of one or more upstream extraction circuits and the output voltage of one or more downstream extraction circuits by transmitting data to the microcomputer 20 via one communication line. Furthermore, the member in which a surge is generated is not limited to being an upstream conducting wire or a downstream conducting wire. If the load includes an inductor, a surge may be generated in the inductor of the load. While the DC power supply 10 is supplying power to an electrical device that includes an inductor, a surge may be generated in the inductor of the electrical device.

Technical features (constituent elements) described in the first to ninth embodiments can be combined with each other, and new technical features can be formed by such combinations.

The first to ninth embodiments disclosed herein should be considered to be illustrative in all respects and not restrictive. The scope of the present disclosure is indicated by the scope of the claims, not the meaning described above, and is intended to include meanings equivalent to the scope of the claims and all changes within the scope of the claims.

The invention claimed is:

1. An in-vehicle device comprising:
   a fuse;
   an upstream capacitor having one end connected to a connection node located upstream of the fuse in a current path of current that flows through the fuse;
   a downstream capacitor having one end connected to a connection node located downstream of the fuse in the current path;
   an upstream reduction circuit configured to reduce a peak value of the upstream voltage;
   a downstream reduction circuit configured to reduce a peak value of the downstream voltage; and
   a determiner configured to determine whether or not the fuse is blown based on an upstream voltage that passed through the upstream capacitor and a downstream voltage that passed through the downstream capacitor, and wherein the determiner determines whether or not the fuse is blown based on the upstream voltage whose peak value was reduced by the upstream reduction circuit and the downstream voltage whose peak value was reduced by the downstream reduction circuit.

2. The in-vehicle device according to claim 1, further comprising:
   a substrate, wherein a terminal of the fuse is attached to the substrate by solder.

3. The in-vehicle device according to claim 1,
   wherein the determiner determines that the fuse is blown in a case where the upstream voltage is greater than or equal to a first threshold and furthermore the downstream voltage is below a second threshold, and
the first threshold is greater than the second threshold.

4. The in-vehicle device according to claim 3,
wherein the determiner includes:
- a first resistor having one end to which a constant voltage is applied;
- a switch downstream of the first resistor in a second current path of current that flows through the first resistor; and
- a second resistor downstream of the switch in the second current path, wherein a voltage of a connection node between the first resistor and the switch is output from the determiner, and
the switch is on in a case where the upstream voltage is greater than or equal to the first threshold and furthermore the downstream voltage is below the second threshold.

5. The in-vehicle device according to claim 1, further comprising:
- an upstream diode configured to prevent the upstream voltage from decreasing to a voltage below a first predetermined voltage; and
- a downstream diode configured to prevent the downstream voltage from decreasing to a voltage below a second predetermined voltage.

6. The in-vehicle device according to claim 5,
wherein the determiner determines that the fuse is blown in a case where the upstream voltage is greater than or equal to a threshold and furthermore the downstream voltage is below a threshold.

7. The in-vehicle device according to claim 1,
wherein the in-vehicle device includes two or more of the fuses and two or more of the downstream capacitors,
ends of the downstream capacitors on one side are connected to connection nodes downstream of the fuses in current paths of current that flows through the fuses,
in the current paths, the fuses have an upstream portion common to all of the fuses,
one end of the upstream capacitor is connected to a connection node of a common portion of the current paths, and
the determiner determines whether or not one of the fuses is blown based on the upstream voltage and the downstream voltage that passed through one of the downstream capacitors.

8. The in-vehicle device according to claim 1,
wherein the in-vehicle device includes two or more of the fuses and two or more of the downstream capacitors,
ends of the downstream capacitors on one side are connected to connection nodes downstream of the fuses in current paths of current that flows through the fuses,
in the current paths, the fuses have an upstream portion common to all of the fuses,
one end of the upstream capacitor is connected to a connection node of a common portion of the current paths, and
the determiner determines whether or not at least one of the fuses is blown based on the upstream voltage and the downstream voltages that passed through the downstream capacitors.

* * * * *